US009547959B2

(12) United States Patent
Brown et al.

(10) Patent No.: US 9,547,959 B2
(45) Date of Patent: Jan. 17, 2017

(54) GAMING SYSTEM AND METHOD PROVIDING A MULTI-HAND CARD GAME WITH A NEW DRAW HAND FOR A DESIGNATED HAND OF CARDS

(71) Applicant: IGT, Las Vegas, NV (US)

(72) Inventors: Bradford D. Brown, Sparks, NV (US); James Cole, Reno, NV (US); Wendy O'Steen-Wilson, Washoe Valley, NV (US)

(73) Assignee: IGT, Las Vegas, NV (US)

( * ) Notice: Subject to any disclaimer, the term of this patent is extended or adjusted under 35 U.S.C. 154(b) by 202 days.

(21) Appl. No.: 14/314,854

(22) Filed: Jun. 25, 2014

(65) Prior Publication Data

US 2015/0379823 A1 Dec. 31, 2015

(51) Int. Cl.
*G06F 17/00* (2006.01)
*G07F 17/32* (2006.01)

(52) U.S. Cl.
CPC ....... *G07F 17/3293* (2013.01); *G07F 17/3244* (2013.01)

(58) Field of Classification Search
None
See application file for complete search history.

(56) References Cited

U.S. PATENT DOCUMENTS 5,100,137 A 3/1992 Fulton et al.
5,167,413 A 12/1992 Fulton et al.
5,251,897 A 10/1993 Fulton et al.
5,322,295 A 6/1994 Cabot et al.
5,374,067 A 12/1994 Jones et al.
5,377,973 A 1/1995 Jones et al.
5,380,012 A 1/1995 Jones et al.
5,382,025 A 1/1995 Sklansky et al.
5,411,257 A 5/1995 Fulton et al.
5,431,408 A 7/1995 Adams et al.
5,437,451 A 8/1995 Fulton et al.
5,531,448 A 7/1996 Moody et al.
5,636,842 A 6/1997 Cabot et al.
5,732,950 A 3/1998 Moody et al.
5,755,621 A 5/1998 Marks et al.
5,803,809 A 9/1998 Yoseloff
5,820,460 A 10/1998 Fulton et al.
5,823,873 A * 10/1998 Moody ..................... A63F 1/00
273/292

(Continued)

*Primary Examiner* — Paul A D'Agostino
(74) *Attorney, Agent, or Firm* — Neal, Gerber & Eisenberg LLP

(57) ABSTRACT

Various embodiments of the present disclosure are directed to a gaming system and method providing a multi-hand card game wherein the gaming system provides a new draw hand for a designated hand of cards. In one embodiment, the gaming system displays a plurality of wagered-on hands of cards. The gaming system determines and displays any awards associated with the wagered-on hands of cards. The gaming system also determines whether any of the wagered-on hands of cards include any designated card combinations. For any of the wagered-on hands of cards including one of the designated card combinations, the gaming system displays a new hand of cards. The gaming system determines and displays any awards associated with each new hand of cards. In various embodiments, the gaming system repeats this process until a terminating condition occurs.

20 Claims, 12 Drawing Sheets

(56) References Cited

U.S. PATENT DOCUMENTS

| | | | |
|---|---|---|---|
| 5,833,536 | A | 11/1998 | Davids et al. |
| 5,882,259 | A | 3/1999 | Holmes et al. |
| 5,911,418 | A | 6/1999 | Adams et al. |
| 5,954,335 | A | 9/1999 | Moody et al. |
| 5,957,774 | A | 9/1999 | Holmes et al. |
| 6,007,066 | A | 12/1999 | Moody et al. |
| 6,033,307 | A | 3/2000 | Vancura et al. |
| 6,050,658 | A | 4/2000 | O'Sullivan et al. |
| 6,059,289 | A | 5/2000 | Vancura et al. |
| 6,062,979 | A | 5/2000 | Inoue |
| 6,098,985 | A | 8/2000 | Moody et al. |
| 6,135,883 | A | 10/2000 | Hachquet |
| 6,176,781 | B1 | 1/2001 | Walker et al. |
| 6,193,235 | B1 | 2/2001 | Vancura et al. |
| 6,196,547 | B1 | 3/2001 | Pascal et al. |
| 6,248,016 | B1 | 6/2001 | Walker et al. |
| 6,257,979 | B1 | 7/2001 | Walker et al. |
| 6,311,978 | B1 | 11/2001 | Moody |
| 6,332,839 | B2 | 12/2001 | Walker et al. |
| 6,334,613 | B1 | 1/2002 | Yoseloff |
| 6,394,902 | B1 | 5/2002 | Glavich et al. |
| 6,398,218 | B1 | 6/2002 | Vancura |
| 6,406,023 | B1 | 6/2002 | Rowe |
| 6,419,578 | B1 | 7/2002 | Moody et al. |
| 6,422,940 | B1 | 7/2002 | Walker et al. |
| 6,443,452 | B1 | 9/2002 | Brune |
| 6,474,645 | B2 | 11/2002 | Tarantino |
| 6,517,074 | B1 | 2/2003 | Moody et al. |
| 6,523,829 | B1 | 2/2003 | Walker et al. |
| 6,533,658 | B1 | 3/2003 | Walker et al. |
| 6,561,898 | B2 | 5/2003 | Moody |
| 6,565,433 | B1 | 5/2003 | Baerlocher et al. |
| 6,568,680 | B1 | 5/2003 | Moody et al. |
| 6,569,014 | B2 | 5/2003 | Walker et al. |
| 6,592,456 | B2 | 7/2003 | Walker et al. |
| 6,648,759 | B2 | 11/2003 | Vancura |
| 6,652,377 | B1 | 11/2003 | Moody |
| 6,672,959 | B2 | 1/2004 | Moody et al. |
| 6,726,427 | B2 | 4/2004 | Jarvis et al. |
| 6,729,961 | B1 | 5/2004 | Millerschone |
| 6,905,405 | B2 | 6/2005 | McClintic |
| 6,913,532 | B2 | 7/2005 | Baerlocher et al. |
| 6,916,245 | B1 | 7/2005 | Vancura et al. |
| 6,935,950 | B2 | 8/2005 | Tarantino |
| 6,955,356 | B2 | 10/2005 | Moody |
| 6,955,600 | B2 | 10/2005 | Glavich et al. |
| 6,960,134 | B2 | 11/2005 | Hartl et al. |
| 6,964,418 | B2 | 11/2005 | Moody |
| 6,969,316 | B2 | 11/2005 | Jarvis et al. |
| 6,988,947 | B2 | 1/2006 | Baerlocher et al. |
| 6,991,538 | B2 | 1/2006 | Cannon |
| 6,994,624 | B2 | 2/2006 | Gold et al. |
| 7,052,395 | B2 | 5/2006 | Glavich et al. |
| 7,056,207 | B2 | 6/2006 | Walker et al. |
| 7,059,965 | B2 | 6/2006 | Jackson |
| 7,066,814 | B2 | 6/2006 | Glavich et al. |
| 7,094,148 | B2 | 8/2006 | Baerlocher et al. |
| 7,121,942 | B2 | 10/2006 | Baerlocher |
| 7,137,628 | B2 | 11/2006 | Moody |
| 7,156,397 | B2 | 1/2007 | Moody et al. |
| 7,156,734 | B1 | 1/2007 | Walker et al. |
| 7,201,655 | B2 | 4/2007 | Walker et al. |
| 7,222,857 | B2 | 5/2007 | Moody |
| 7,222,858 | B2 | 5/2007 | Moody |
| 7,235,011 | B2 | 6/2007 | Randall et al. |
| 7,238,110 | B2 | 7/2007 | Glavich et al. |
| 7,247,091 | B2 | 7/2007 | Moody |
| 7,247,092 | B2 | 7/2007 | Jarvis et al. |
| 7,258,611 | B2 | 8/2007 | Bigelow, Jr. et al. |
| 7,275,990 | B2 | 10/2007 | Walker et al. |
| 7,297,057 | B2 | 11/2007 | Gerrard et al. |
| 7,316,608 | B2 | 1/2008 | Moody |
| 7,322,887 | B2 | 1/2008 | Belger et al. |
| 7,331,867 | B2 | 2/2008 | Baerlocher et al. |
| 7,354,344 | B2 | 4/2008 | Paulsen et al. |
| 7,381,134 | B2 | 6/2008 | Cuddy et al. |
| 7,384,334 | B2 | 6/2008 | Glavich et al. |
| 7,387,568 | B2 | 6/2008 | Millerschone |
| 7,390,258 | B2 | 6/2008 | Millerschone |
| 7,393,276 | B2 | 7/2008 | Millerschone |
| 7,402,103 | B2 | 7/2008 | Baerlocher |
| 7,404,762 | B2 | 7/2008 | Moody |
| 7,416,186 | B2 | 8/2008 | Walker et al. |
| 7,419,162 | B2 | 9/2008 | Lancaster et al. |
| 7,431,644 | B2 | 10/2008 | Moody |
| 7,467,542 | B2 | 12/2008 | Elrod |
| 7,473,174 | B2 | 1/2009 | Cuddy et al. |
| 7,481,708 | B2 | 1/2009 | Baerlocher et al. |
| 7,488,251 | B2 | 2/2009 | Kaminkow |
| 7,513,826 | B2 | 4/2009 | Cuddy |
| 7,524,243 | B2 | 4/2009 | Bansemer et al. |
| 7,553,231 | B2 | 6/2009 | Rodgers et al. |
| 7,572,183 | B2 | 8/2009 | Olivas et al. |
| 7,614,946 | B2 | 11/2009 | Nicely |
| 7,641,197 | B2 | 1/2010 | Jackson |
| 7,658,672 | B1 | 2/2010 | Wolf et al. |
| 7,666,083 | B2 | 2/2010 | Baerlocher et al. |
| 7,682,246 | B2 | 3/2010 | Cregan et al. |
| 7,690,982 | B2 | 4/2010 | Cuddy |
| 7,690,987 | B2 | 4/2010 | Baerlocher et al. |
| 7,731,584 | B2 | 6/2010 | Glavich et al. |
| 7,740,533 | B2 * | 6/2010 | Walker ................ A63F 3/00157 273/292 |
| 7,748,714 | B2 | 7/2010 | Nicely et al. |
| 7,749,059 | B2 | 7/2010 | Tarantino |
| 7,749,061 | B2 | 7/2010 | Walker et al. |
| 7,749,063 | B2 | 7/2010 | Belger et al. |
| 7,771,274 | B2 | 8/2010 | Walker et al. |
| 7,785,188 | B2 | 8/2010 | Cannon |
| 7,789,747 | B2 | 9/2010 | Glavich et al. |
| 7,803,041 | B2 | 9/2010 | Gold et al. |
| 7,803,043 | B2 | 9/2010 | Jackson |
| 7,815,500 | B2 | 10/2010 | Montross et al. |
| 7,824,263 | B2 | 11/2010 | Baerlocher |
| 7,837,545 | B2 | 11/2010 | Blair, Jr. et al. |
| 7,857,693 | B1 | 12/2010 | Johnson et al. |
| 7,862,417 | B2 | 1/2011 | Nicely |
| 7,862,429 | B2 | 1/2011 | Walker et al. |
| 7,867,073 | B2 | 1/2011 | Walker et al. |
| 7,883,406 | B2 | 2/2011 | Vancura |
| 7,914,369 | B2 | 3/2011 | Walker et al. |
| 7,918,724 | B2 | 4/2011 | Walker et al. |
| 7,922,571 | B2 | 4/2011 | Walker et al. |
| 7,927,206 | B2 | 4/2011 | Baerlocher et al. |
| 7,993,191 | B2 | 8/2011 | Evans et al. |
| 7,993,195 | B2 | 8/2011 | Belger et al. |
| 8,029,358 | B2 | 10/2011 | Bigelow, Jr. et al. |
| 8,033,903 | B2 | 10/2011 | Cregan |
| 8,062,119 | B2 | 11/2011 | Stern et al. |
| 8,083,578 | B2 | 12/2011 | Jackson |
| RE43,114 | E | 1/2012 | Walker et al. |
| 8,092,290 | B2 | 1/2012 | Darby |
| 8,092,291 | B2 | 1/2012 | Gerrard et al. |
| 8,100,748 | B2 | 1/2012 | Montross et al. |
| 8,105,156 | B2 | 1/2012 | Walker et al. |
| 8,113,942 | B2 | 2/2012 | Hoffman et al. |
| 8,113,943 | B2 | 2/2012 | Cuddy |
| 8,123,604 | B2 | 2/2012 | Lancaster et al. |
| 8,137,174 | B2 | 3/2012 | Nicely et al. |
| 8,142,274 | B2 | 3/2012 | Baerlocher |
| 8,147,310 | B2 | 4/2012 | Jarvis et al. |
| 8,152,615 | B2 | 4/2012 | Lancaster et al. |
| 8,157,631 | B2 | 4/2012 | Lancaster et al. |
| 8,172,660 | B2 | 5/2012 | Lancaster et al. |
| 8,177,616 | B2 | 5/2012 | Nicely |
| 8,177,619 | B2 | 5/2012 | Jackson |
| 8,197,319 | B2 | 6/2012 | Nicely |
| 8,197,321 | B2 | 6/2012 | Wolf et al. |
| 8,210,532 | B2 | 7/2012 | Evans et al. |
| 8,210,533 | B2 | 7/2012 | Evans et al. |
| 8,216,039 | B2 | 7/2012 | Nicely et al. |
| 8,226,469 | B2 | 7/2012 | Pawloski et al. |
| 8,231,454 | B2 | 7/2012 | Caputo |
| 8,231,456 | B2 | 7/2012 | Zielinski |

(56) References Cited

U.S. PATENT DOCUMENTS 8,235,780 B2 8/2012 Nicely
8,235,781 B2 8/2012 Moody
8,241,108 B2 8/2012 Belger et al.
8,246,444 B2 8/2012 Baerlocher et al.
8,251,798 B2 8/2012 Belger et al.
8,257,163 B2 9/2012 Belger et al.
8,262,448 B2 9/2012 Nicely et al.
8,262,455 B2 9/2012 Caputo et al.
8,272,940 B2 9/2012 Cuddy et al.
8,272,946 B2 9/2012 Cuddy et al.
8,277,305 B2 10/2012 Caputo et al.
8,292,726 B2 10/2012 Souza et al.
RE43,822 E 11/2012 Walker et al.
8,328,614 B2 12/2012 Jones et al.
8,328,623 B2 12/2012 Stern et al.
8,353,751 B2 1/2013 Bickley et al.
8,366,538 B1 2/2013 Saunders et al.
8,393,957 B2 3/2013 Walker et al.
8,398,472 B2 3/2013 Bansemer et al.
8,398,473 B2 3/2013 Baerlocher et al.
8,403,739 B2 3/2013 Jackson
8,408,984 B2 4/2013 Walker et al.
8,419,518 B2 4/2013 Jarvis et al.
8,419,525 B2 4/2013 Caputo et al.
8,434,764 B2 5/2013 Walker et al.
8,444,465 B2 5/2013 Macaulay
8,449,362 B2 5/2013 Jackson
8,449,363 B2 5/2013 Baerlocher et al.
8,449,364 B2 5/2013 Lancaster et al.
8,460,094 B2 6/2013 Bigelow, Jr. et al.
8,475,253 B1 7/2013 Cole
8,475,255 B2 7/2013 Wolf et al.
8,485,880 B2 7/2013 Nicely
8,491,390 B2 7/2013 Cregan
8,512,138 B2 8/2013 Saunders
2004/0188938 A1* 9/2004 Moody ............... G07F 17/3293 273/292
2005/0148378 A1* 7/2005 Fasbender ............... G07F 17/34 463/13
2005/0266917 A1* 12/2005 Glavich .................. G07F 17/32 463/20
2006/0009277 A1 1/2006 Hartl et al.
2006/0258422 A1 11/2006 Walker et al.
2008/0111309 A1 5/2008 Nicely et al.
2008/0188278 A1 8/2008 Paulsen et al.
2008/0200232 A1 8/2008 Baerlocher et al.
2008/0207298 A1 8/2008 Marks et al.
2008/0220851 A1 9/2008 Glavich et al.
2008/0254847 A1 10/2008 Millerschone
2010/0004051 A1 1/2010 Walker et al.
2010/0099480 A1 4/2010 Caputo
2010/0120484 A1 5/2010 Caputo et al.
2010/0124970 A1 5/2010 Pawloski et al.
2010/0227661 A1 9/2010 Walker et al.
2011/0014963 A1 1/2011 Walker et al.
2011/0111818 A1 5/2011 Baerlocher
2012/0122534 A1 5/2012 Montross et al.
2012/0149451 A1 6/2012 Nicely et al.
2012/0157180 A1 6/2012 Baerlocher
2012/0270622 A1 10/2012 Pawloski et al.
2012/0276971 A1 11/2012 Nicely et al.
2012/0282996 A1 11/2012 Nicely et al.
2012/0289310 A1 11/2012 Baerlocher et al.
2012/0295683 A1* 11/2012 Moody ............... G07F 17/3293 463/13
2012/0322534 A1 12/2012 Belger et al.
2012/0329543 A1 12/2012 Nicely et al.
2013/0040721 A1 2/2013 Belger et al.
2013/0143635 A1 6/2013 Arora et al.
2013/0150145 A1 6/2013 Walker et al.
2013/0150153 A1 6/2013 Walker et al.
2013/0172064 A1 7/2013 Bansemer et al.
2013/0172065 A1* 7/2013 Jackson .............. G07F 17/3211 463/13
2013/0190067 A1 7/2013 Saunders
2013/0210512 A1 8/2013 Meyer
2013/0217457 A1 8/2013 Jarvis et al.
2013/0225258 A1 8/2013 Caputo et al.
2013/0231170 A1 9/2013 Macaulay
2013/0231176 A1 9/2013 Walker et al.
2015/0364011 A1* 12/2015 Berman .................... A63F 9/24 463/13

* cited by examiner

GAMING SYSTEM AND METHOD PROVIDING A MULTI-HAND CARD GAME WITH A NEW DRAW HAND FOR A DESIGNATED HAND OF CARDS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player receives five cards dealt face up from a fifty-two card deck of playing cards. The player can discard none, one, a plurality, or all of the five cards. Each discarded card is replaced with another card from the deck. After the replacement (if any), the cards are evaluated for winning combinations. For a five-card poker game, there are typically ten general categories of hands, ranked from highest to lowest, as shown in Table 1 below.

TABLE 1

Ranking of Five Card Poker Hands by Category

| Rank | Name | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four of a Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♠ 5♠ 4♣ |
| 7 | Three of a Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | High Card | A♥ 10♣ 7♦ 5♠ 3♠ |

Within each category, hands are ranked according to the rank of individual cards, with an Ace being the highest card and a Two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of Straight Flush, Four of a Kind, or Flush. There are over a hundred equivalent hands for each Two Pair variation, and there are over 1,000 equivalent hands for each type of no-pair hand.

Numerous variations of poker exist, including Five Card Draw as mentioned above, Three Card Poker, Five Card Stud, Seven Card Stud, Hold 'Em (also called Texas Hold 'Em), Omaha (also called Omaha Hold 'Em), and Pai-Gow Poker. These games generally differ in the manner in which cards are dealt and in the manner and frequency in which bets are placed. Various criteria may also be used to determine the winning hand, including the highest ranking hand, the lowest ranking hand (Low-Ball), and where the highest ranking and lowest ranking hands each win half of the pot (High-Low).

Another known poker game includes multiple hands of poker played simultaneously. In one such game, the player is dealt a plurality of hands of cards, such as three, five, ten, fifty or one-hundred individual hands of cards. In certain known multi-hand poker games, the gaming system initially displays the same cards for each of the individual hands of cards. In other known multi-hand poker games, the gaming system initially displays a primary hand and the gaming system does not initially display any individual cards for the remaining simultaneously played hands. The gaming system enables the player to choose the cards to hold, if any, in a primary hand. The held cards in the primary hand are also held in each of the remaining hands of cards. After holding zero, one or more cards in the primary hand (and thus holding zero, one or more of the same cards in each of the remaining hands), the gaming system removes the remaining non-held playing cards from each of the hands of cards. For each hand of cards, a replacement card is independently dealt for each removed, non-held playing card, wherein each hand of cards is associated with its own deck of cards. Each individual poker hand is compared, hand by hand, to a payout table which utilizes conventional poker hand rankings to determine the award, if any, associated with each of the individual poker hands. A total award based on any of the determined awards is provided to the player.

In certain known multiplayer variations of poker, players play against each other rather than against a dealer or house. In certain of these variations, a round of play begins when each player has placed an initial bet, which is typically referred to as the ante, into the pot. The term pot typically refers to the total accumulation of antes and wagers made during a particular game. In other poker variations, such as Texas Hold 'Em (described in further detail below), only two players at a table make the initial bets, which are commonly referred to as the blinds.

The quantity of cards dealt depends on the particular variation of poker being played. For example, in Five Card Draw, each player is initially dealt five cards. In typical Three Card Poker games where the player plays against a dealer hand, the player is dealt a total of three cards and the dealer hand includes a total of three cards as well. In certain known Three Card Poker games, the initially dealt player hand and dealer hand are final and there is no option to replace or draw any new cards. In Texas Hold 'Em, Five Card Stud and Seven Card Stud, each player is initially dealt two cards. These cards are typically dealt face-down. However, depending on the game, some of the cards may be dealt face-up to the player. For example, in certain versions of Five Card Stud, each player is initially dealt one card face-up and one card face-down. In Texas Hold 'Em, each player is initially dealt two cards face-down, which are commonly referred to as the hole cards.

For certain poker variations in which additional cards are dealt or in which cards may be replaced, after the initial deal, a first round of wagering begins, in which the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by at least one remaining player such that each remaining player has wagered the same amount into the pot during the round.

Depending on the variation of poker being played, each game may have only an initial wager or several rounds of wagering, where each round of wagering is generally preceded by the dealing of one or more cards. A player wins a game of poker by being the last remaining player in the game after all other players have folded or by having the highest ranking hand when a showdown occurs. If two or more players remain after the final round of wagering is complete, a showdown occurs. During the showdown, each remaining player's hand is displayed, the highest ranking hand is determined to be the winning hand, and the pot is provided to the player having the winning hand. If two or more players have identically ranked hands that are the highest ranking hands, the pot is split evenly among the tying players.

Of the poker variations mentioned above, Texas Hold 'Em is one of the more popular versions. Texas Hold 'Em is generally a multi-player card game played at a live card table or via a computer-based virtual card table. In one version of a live card table game of Texas Hold 'Em, only two players at a table make the initial bets, commonly referred to as the blinds. The blinds include a big blind and a small blind. The big blind is typically twice the value of the small blind. In a blind-based game such as Texas Hold 'Em, all players are initially eligible to receive a hand, even if they do not place the big blind or the small blind. After the players have anted (if an ante is required), each player eligible for play is dealt an initial set of cards. Each of the players must match the blinds, raise the blinds or fold. Texas Hold 'Em includes a designated quantity of community cards (usually five) that can be used by all of the players in combination with their hole cards. However, in certain variations, there may only be three community cards. In certain Texas Hold 'Em games, the community cards are dealt over the course of several wagering rounds. For example, the gaming device or dealer deals the flop (usually three cards), the turn (usually one card), and the river (usually one card). The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold 'Em. In other variations of Texas Hold 'Em, where the quantity of community cards is only three, the flop is a single card rather than three cards.

Various commercially available gaming systems enable players to play more than one wagering game simultaneously. Certain of these gaming systems enable players to play multiple plays of a same wagering game simultaneously, plays of different wagering games simultaneously, or both. Providing a gaming system in which a player may play a plurality of plays of one or more wagering games at once enhances player enjoyment and excitement by reducing the boredom and monotony of playing a single play of the same wagering game several consecutive times at the same gaming system.

Gaming systems that provide games having cascading symbols features are also known. For one such game employing a cascading symbols feature, a gaming system generates and displays a plurality of symbols at a plurality of symbol display areas. The gaming system evaluates the displayed symbols and provides an award for each formed winning symbol combination (if any). The gaming system then removes the displayed symbols that form the winning symbol combination(s) to create one or more empty symbol display areas. The gaming system repositions or shifts zero, one, or more of the remaining displayed symbols into zero, one, or more of the empty symbol display areas. If any empty symbol display areas remain, the gaming system generates and displays a symbol at each empty symbol display area. The gaming system reevaluates the displayed symbols and provides an award for each formed winning symbol combination. The gaming system repeats the steps of removing generated symbols, repositioning or shifting generated symbols, generating new symbols, and evaluating the generated symbols. Repeating the steps as described increases player excitement and enjoyment by providing awards for winning symbol combinations not available after the initial generation of symbols. However, the lack of symbol repositioning (i.e., cascading) that occurs when displayed symbols are removed from a top row of symbol display areas is frustrating for certain players and may detract from what should otherwise be an exciting feature.

There is a continuing need for new and exciting poker games to keep players engaged during game play, increase entertainment value, and provide additional excitement to players.

SUMMARY

Various embodiments of the present disclosure are directed to a gaming system and method providing a multi-hand card game wherein for a play of the game, for a designated hand of cards, the gaming system provides a new draw hand.

In various embodiments, the gaming system provides a multi-hand draw poker card game and enables a player to wager on one or more of a plurality of hands of cards. Upon receiving the wager, the gaming system initiates a play of the game having a first quantity of wagered-on hands of cards including a base hand of cards. The gaming system randomly selects and displays the base hand of cards from a first virtual deck of cards. The gaming system enables the player to select zero, one, or a plurality of cards from the base hand of cards to hold for the play of the game. For each of the other wagered-on hands of cards, the gaming system displays a duplicate of the held base cards from the base hand of cards. The gaming system then completes each of the wagered-on hands of cards with any needed replacement cards from a separate virtual deck of cards for that hand of cards. After completing the wagered-on hands of cards, the gaming system determines and displays any awards associated with the completed wagered-on hands of cards based on a paytable. The gaming system also determines whether any of the completed wagered-on hands of cards includes any designated card combination. In this embodiment, each designated card combination is one of the winning card combinations based on the paytable. If none of the completed wagered-on hands of cards includes any designated card combination, the gaming system ends the play of the game. If any of the completed wagered-on hands of cards includes any designated card combination, for each completed wagered-on hand of cards including one of the designated card combinations, the gaming system displays a new hand of cards. For each new hand of cards, the gaming system displays a duplicate of the held base cards from the base hand of cards and completes the new hand of cards with any needed replacement cards from a separate virtual deck of cards. The gaming system then determines and displays any awards associated with the completed new hands of cards based on a paytable. Such a configuration thus provides a new draw hand for a designated hand of cards for a play of a game.

It should be appreciated that in various embodiments, the gaming system repeats this process until a terminating condition occurs. In the embodiment described above, the gaming system provides one round of new hands of cards for a play of the game. In an alternative embodiment, the gaming system provides a different determined quantity of rounds of new hands and the terminating condition occurs when the gaming system reaches the determined quantity of rounds. In another embodiment, the terminating condition is that there are no new hands of cards including any designated card combination. In other alternative embodiments, the gaming system provides a determined quantity of total new hands of cards. In such an embodiment, the terminating condition is triggered once the gaming system provides the determined quantity of total new hands of cards.

In one example embodiment, the gaming system provides a multi-hand draw poker card game and enables a player to wager on one or more of a plurality of hands of cards. Upon receiving the wager, the gaming system initiates a play of the game having a first quantity of ten wagered-on hands of cards including a base hand of cards. In this embodiment, the gaming system randomly selects and displays the base hand of five cards from a first standard virtual deck of 52 cards. The gaming system enables the player to select zero, one or a plurality of cards of the base hand of cards to hold for the play of the game. In this example, the player selects two cards from the base hand of cards to hold. For each of the remaining nine hands of cards, the gaming system displays a duplicate of the two held base cards from the base hand of cards. The gaming system completes each of the ten wagered-on hands of cards with three replacement cards from a separate virtual deck of cards for each hand. In this embodiment, the gaming system uses a separate virtual deck of 50 cards (i.e., excluding the two held base cards from the base hand of cards) to complete each of the wagered-on hands of cards. The gaming system then determines and displays any awards associated with the completed wagered-on hands of cards based on a paytable.

The gaming system also determines whether any of the completed wagered-on hands of cards includes any designated card combination. In this example embodiment, each designated card combination is any of the winning card combinations based on the paytable. If the gaming system determines that no completed wagered-on hands of cards including one of the designated card combinations, the gaming system ends the play of the game. If, on the other hand, the gaming system determines that at least one of the completed wagered-on hands of cards includes any designated card combination, the gaming system provides a new hand of cards for each completed wagered-on hand of cards including one of the designated card combinations. In this example, six of the ten completed wagered-on hands of cards include one of the designated card combinations.

In this example embodiment, prior to displaying the six new hands of cards, the gaming system reconfigures the display of the hands of cards. More specifically, the gaming system removes the six completed wagered-on hands of cards including one of the designated card combinations from the display, and groups the remaining four hands of cards at the bottom of the display. Thus, the open spaces from the six removed completed wagered-on hands of cards are at the top of the display and in the six open spaces, the gaming system provides six new hands of cards.

For each of the six new hands of cards, the gaming system displays a duplicate of the two held base cards from the base hand of cards. The gaming system completes each new hand of cards with any needed replacement cards from a separate virtual deck of cards of 50 cards (i.e., a standard virtual deck of 52 cards with the two held base cards removed). The gaming system then determines and displays any awards associated with the new hands of cards based on the paytable.

The gaming system also determines whether any of the completed new hands of cards include any designated card combination. In this embodiment, the designated card combinations are any of the winning card combinations based on the paytable. If the gaming system determines that none of the completed new hands of cards includes any designated card combination, the gaming system ends the play of the game. On the other hand, if the gaming system determines that at least one of the completed new hands of cards includes any designated card combination, the gaming system provides second new hand of cards for each completed new hand of cards including one of the designated card combinations. In this embodiment, the gaming system continues this process until there are no new hands of cards including one of the designated card combinations.

It should be appreciated that in various embodiments of the present disclosure, where the gaming system repeats the process until there are no new hands of cards including one of the designated card combinations, the play of the game may continue for many rounds. In such an embodiment, the greater the first quantity of hands of cards that a player wagers on, the more opportunities the player receives for obtaining new hands of cards and for the play of the game to continue. Such a configuration enables the player to play for an extended period of time for each play of the game with multiple opportunities to obtain a winning hand. The present disclosure thus provides a new and exciting card game that keeps players engaged during game play, increases entertainment value, and provides additional player excitement.

Additional features and advantages are described herein, and will be apparent from, the following Detailed Description and the Figures.

DETAILED DESCRIPTION

Card Game with Multiple Draw Hands

Figure 1:
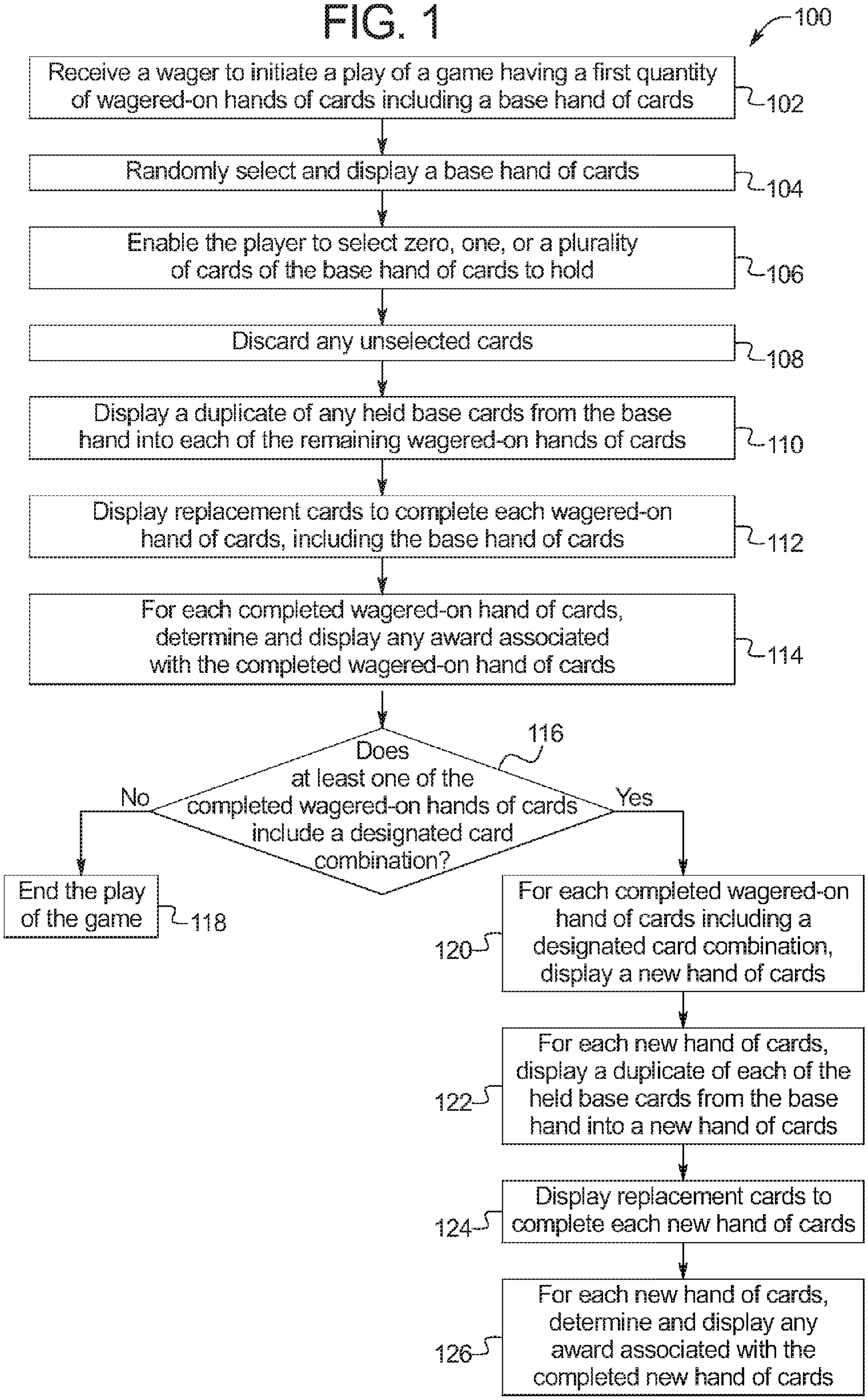
FIG. 1 is a flowchart illustrating a method of operating an example embodiment of the gaming system of the present disclosure configured to operate the card game wherein for a play of the game, the gaming system provides a new draw hand for each hand of cards including any designated card combination.

Various embodiments of the present disclosure are directed to a gaming system and method providing a multi-hand card game wherein for a play of the game, for each designated hand of cards, the gaming system provides a new draw hand.

In various embodiments, the gaming system provides a multi-hand draw poker card game and enables a player to wager on one or more of a plurality of hands of cards. Upon receiving the wager, the gaming system initiates a play of the game having a first quantity of wagered-on hands of cards including a base hand of cards. The gaming system randomly selects and displays the base hand of cards from a first virtual deck of cards. The gaming system enables the player to select zero, one, or a plurality of cards from the base hand of cards to hold for the play of the game. For each of the other wagered-on hands of cards, the gaming system displays a duplicate of the held base cards from the base hand of cards. The gaming system then completes each of the wagered-on hands of cards with any needed replacement cards from a separate virtual deck of cards for each hand of cards. After completing the wagered-on hands of cards, the gaming system determines and displays any awards associated with the completed wagered-on hands of cards based on a paytable. The gaming system also determines whether any of the completed wagered-on hands of cards includes any designated card combination. In this embodiment, each designated card combination is one of the winning card combinations based on the paytable. If none of the completed wagered-on hands of cards includes any designated card combination, the gaming system ends the play of the game. If any of the completed wagered-on hands of cards includes one of the designated card combinations, for each completed wagered-on hand of cards including one of the designated card combinations, the gaming system displays a new hand of cards. For each new hand of cards, the gaming system displays a duplicate of the held base cards from the base hand of cards and completes the new hand of cards with any needed replacement cards from a separate virtual deck of cards. The gaming system then determines and displays any awards associated with the completed new hands of cards based on a paytable. In this embodiment, the gaming system provides one round of new hands of cards for the play of the game. In other alternative embodiments, the gaming system repeats this process until a terminating condition occurs. Such a configuration thus provides a new draw hand for a designated hand of cards for a play of a game.

While the card game of the present disclosure is employed as a base or primary game in the embodiments described below, it should be appreciated that the card game may additionally or alternatively be employed as or in association with a bonus game or a secondary game. Moreover, while any credit balances, any wagers, and any awards are displayed as amounts of monetary currency, credits, or “chips” representing monetary currency or credits in the embodiments described below, one or more of such credit balances, such wagers, and such awards may be for non-monetary credits, promotional credits, player tracking points or credits, or chips representing any thereof.

In various example embodiments described below, while the example card games are variations of draw poker games, it should be appreciated that the present disclosure contemplates employing any other suitable type of card game instead of or in addition to draw poker games.

Referring now to FIG. 1, which illustrates a flowchart of an embodiment of a process for operating a gaming system disclosed herein. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the gaming system provides a multi-hand draw poker card game and enables a player to wager on one or more of a plurality of hands of cards. For a play of a game, the gaming system receives a wager to initiate a play of the game having a first quantity of wagered-on hands of cards including a base hand of cards, as indicated by block 102. In this example embodiment, a player places a wager on each of a first quantity of ten hands of cards.

For a first round of the play of the game, the gaming system randomly selects and displays a base hand of five cards from a first virtual deck of 52 cards, as indicated by block 104. The gaming system enables the player to select zero, one, or a plurality of cards of the base hand of cards to hold for the play of the game, as indicated by block 106. In this example, the player selects three cards of the base hand of cards to hold for the play of the game. The gaming system discards any unselected cards of the base hand of cards, as indicated by block 108. For each of the other nine wagered-on hands of cards, the gaming system displays a duplicate of the three held base cards from the base hand of cards, as indicated by block 110.

It should be appreciated that, in this embodiment, if the player selects zero cards from the base hand of cards to hold for the play of the game, the gaming system discards all five unselected cards of the base hand of cards. In this embodiment, the gaming system does not initially display any cards for the other nine hands of cards. In certain alternative embodiments, as will be described in greater detail below, the gaming system randomly selects and displays a separate initial hand of cards for each of the first quantity of wagered-on hands of cards and enables the player to select zero, one, or a plurality of cards to hold for each wagered-on hand of cards.

In this embodiment, the gaming system randomly selects and displays two replacement cards to complete each of the first quantity of ten wagered-on hands of cards, as indicated by block 112. In this embodiment, the gaming system randomly selects the replacement cards from a separate virtual deck of cards for each wagered-on hand of cards. In this embodiment, if the player selects zero cards of the base hand of cards to hold, the gaming system uses a new standard virtual deck of 52 cards to randomly select cards to complete each wagered-on hand of cards. If the player selects one or more of the base hand of cards to hold, the gaming system uses a new modified standard virtual deck of cards to complete each wagered-on hand of cards. More specifically, in this example, since the gaming system duplicates each of the three base cards held from the base hand for each of the hands of cards, the gaming system removes the three base cards from each separate virtual deck of cards used for each wagered-on hand of cards. Thus, in this example, for the base hand of cards, the gaming system continues to use the first virtual deck of cards and for each of the remaining wagered on hands of cards, the gaming system uses a separate virtual deck of 49 cards.

In an alternative embodiment, for each wagered-on hand of cards, the gaming system randomly selects and displays replacement cards from a separate virtual deck of 52 cards.

It should be appreciated that in such an embodiment, there is a duplicate of each card held from the base hand of cards. Thus, in such an embodiment, the gaming system provides the opportunity for additional winning card combinations such as a five-of-a-kind.

After completing each of the ten wagered-on hands of cards, for each completed wagered-on hand of cards, the gaming system determines and displays any awards associated with the completed wagered on hand of cards, as indicated by block 114. In this embodiment, the gaming system evaluates each hand of cards based on a standard five-card Jacks or Better paytable. It should be appreciated, that in this example embodiment, the gaming system evaluates each of the completed wagered-on hands of cards and displays a total award including any awards associated with any of the completed wagered-on hands of cards.

The gaming system also determines whether any of the completed wagered-on hands of cards includes any designated card combination, as indicated by diamond 116. In this example embodiment, each designated card combination is any of the winning card combinations based on the standard Jacks or Better paytable. If the gaming system determines that none of the completed wagered-on hands of cards include one of the designated card combinations, the gaming system ends the play of the game, as indicated by block 118.

In this example, the gaming system determines that six of the completed wagered-on hands of cards each include one of the designated card combinations. Since at least one of the completed wagered-on hands of cards includes one of the designated card combinations, the gaming system displays a new hand of cards for each of the six hands of cards including one of the designated card combinations, as indicated by block 120. The gaming system displays the new hands of cards for a second round of the play of the game.

In this embodiment, prior to displaying the new hands of cards, the gaming system reconfigures the display of the hands of cards. More specifically, in this embodiment, the gaming system removes each of the six completed wagered-on hands of cards that include one of the designated card combinations from the display. The gaming system moves the remaining four hands of cards down to the bottom of the display so that the six open spaces from the removed hands of cards are at the top of the display. The gaming system provides six new hands of cards to replace each removed hand.

It should be appreciated that in certain alternative embodiments, the gaming system reconfigures the display in a suitable different way. In other alternative embodiments, the gaming system does not reconfigure the display.

For each of the six new hands of cards, the gaming system displays a duplicate of each of the three held base cards from the base hand of cards, as indicated by block 122. The gaming system randomly selects and displays replacement cards to complete each of the six new hands of cards, as indicated by block 122. In this embodiment, the gaming system randomly selects the replacement cards from a separate, modified virtual deck of cards for each new hand of cards. As described above, the gaming system completes each new hand of cards from a separate virtual deck of 49 cards with the three held base cards removed from the virtual deck of cards.

After the gaming system completes each new hand of cards with any needed replacement cards, the gaming system determines and displays any awards associated with each completed new hand of cards, as indicated by block 126. The gaming system evaluates each new hand based on the paytable.

In this example embodiment, the gaming system ends the play of the game after providing one round of new hands of cards for each completed wagered on hand of cards including any designated card combination. It should be appreciated that in various embodiments, the gaming system repeats this process until a terminating condition occurs. In the embodiment described above, the gaming system provides one round of new hands of cards for a play of the game. In an alternative embodiment, the gaming system provides a different determined quantity of rounds of new hands and the terminating condition occurs when the gaming system reaches the determined quantity of rounds. In another embodiment, the terminating condition is that there are no new hands of cards including any designated card combination. In other alternative embodiments, the gaming system provides a determined quantity of total new hands of cards. In such an embodiment, the terminating condition is triggered once the gaming system provides the determined quantity of total new hands of cards.

It should be appreciated that in certain alternative embodiments, the gaming system continues to determine whether any of the completed new hands of cards includes any designated card combinations. If none of the completed new hands of cards include any designated card combination, the gaming system ends the play of the game. If at least one completed new hands of cards includes any designated card combination, the gaming system displays another new hand of cards for each completed hand of cards that includes one of the designated card combinations.

It should be appreciated that such a configuration provides the player multiple opportunities to obtain a hand of cards associated with an award. As such, the present disclosure provides a game that keeps players excited and engaged.

Turning now to FIGS. 2A, 2B, 2C, 2D, 2E, 2F, and 2G, which illustrate screen shots of one example embodiment of the gaming system of the present disclosure operating a card game wherein the gaming system provides a new draw hand for each hand of cards including any designated card combination, as described above with respect to FIG. 1. In this example embodiment, the gaming system displays: (a) a plurality of meters including: (i) a credit meter 202 that displays the player's credit balance (in credit or currency form), (ii) a wager or bet meter 204 that displays any wager or bet placed on a play of the game (in credit or currency form), and (iii) an award meter 206 that displays any awards won for the play of the game (in credit or currency form); and (b) a message box 250 that displays a variety of messages or indications before, during, or after play of the game.

Figure 2A:
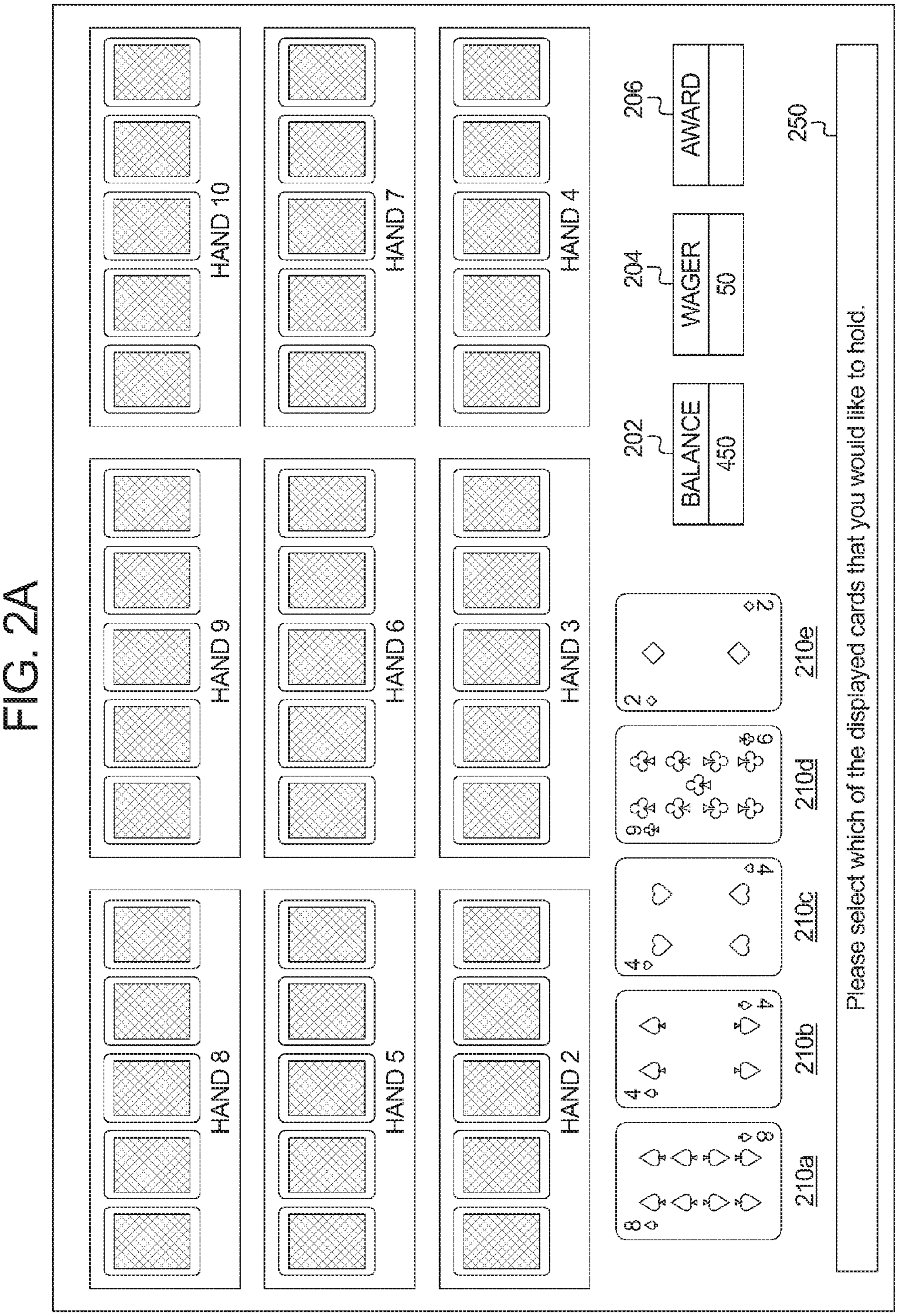
FIGS. 2A, 2B, 2C, 2D, 2E, 2F, and 2G illustrate screen shots of an example of one embodiment of the gaming system of the present disclosure providing a card game wherein for a play of the game, the gaming system provides a new draw hand for each hand of cards including any designated card combination, according to the method of FIG. 1.

As illustrated in FIG. 2A, in this embodiment, the gaming system provides a draw poker game with a plurality of hands of cards. The gaming system enables the player to place a wager on one or more of the plurality of hands. In this example, the player places a wager of five credits for each of a first quantity of ten hands of cards. Thus, the player places a total wager of fifty credits for a first quantity of ten wagered-on hands of cards, as indicated by the wager meter 204. In this example, the gaming system randomly selects and displays the base hand of cards 210 including five cards 210*a*, 210*b*, 210*c*, 210*d*, and 210*e* from a first virtual deck of 52 cards and displays the base hand of cards 210 face up. More specifically, this example embodiment the gaming system displays the hand of cards including the: 8♠, 4♠, 4♥, 9♣, and 2♦, as indicated by 210*a*, 210*b*, 210*c*, 210*d* and 210*e*. The gaming system enables the player to select zero, one, or a plurality of cards of the base hand of cards to hold for the play of the game. The gaming system displays the following message in the message box 250: “PLEASE SELECT WHICH CARDS YOU WOULD LIKE TO HOLD FOR THE PLAY OF THE GAME!”

Figure 2B:
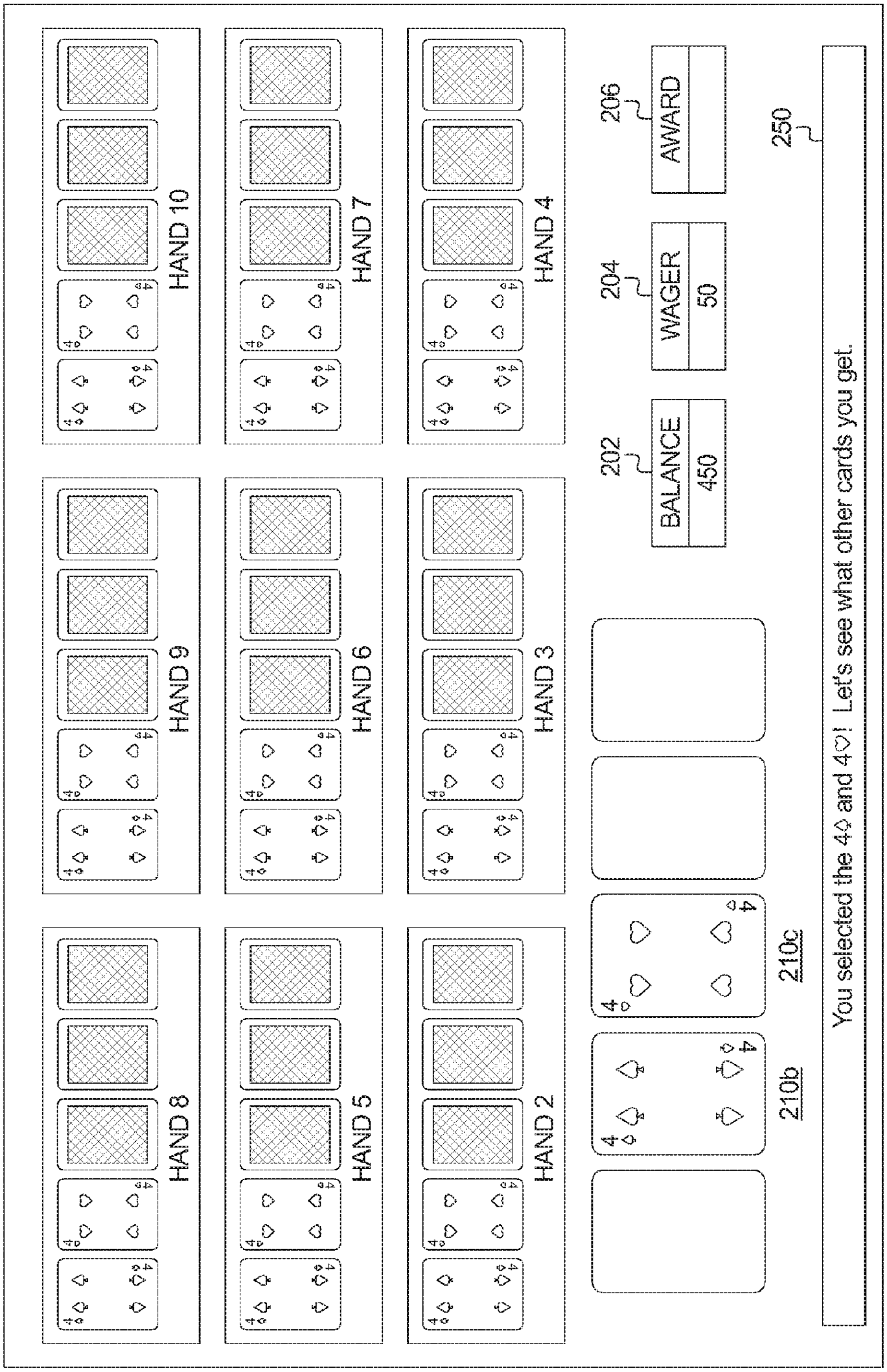

Turning to FIG. 2B, the player selects the 4♠ and 4♥ to hold for the play of the game. As illustrated in FIG. 2B, the gaming system discards the remaining unselected cards of the base hand of cards. The gaming system also displays a duplicate of the 4♠ and 4♥, held from the base hand of cards for each of Hands 2 to 10. The gaming system displays the following message in the message box 250: “YOU SELECTED THE 4♠ AND 4♥! LET’S SEE WHAT OTHER CARDS YOU GET!”

Figure 2C:
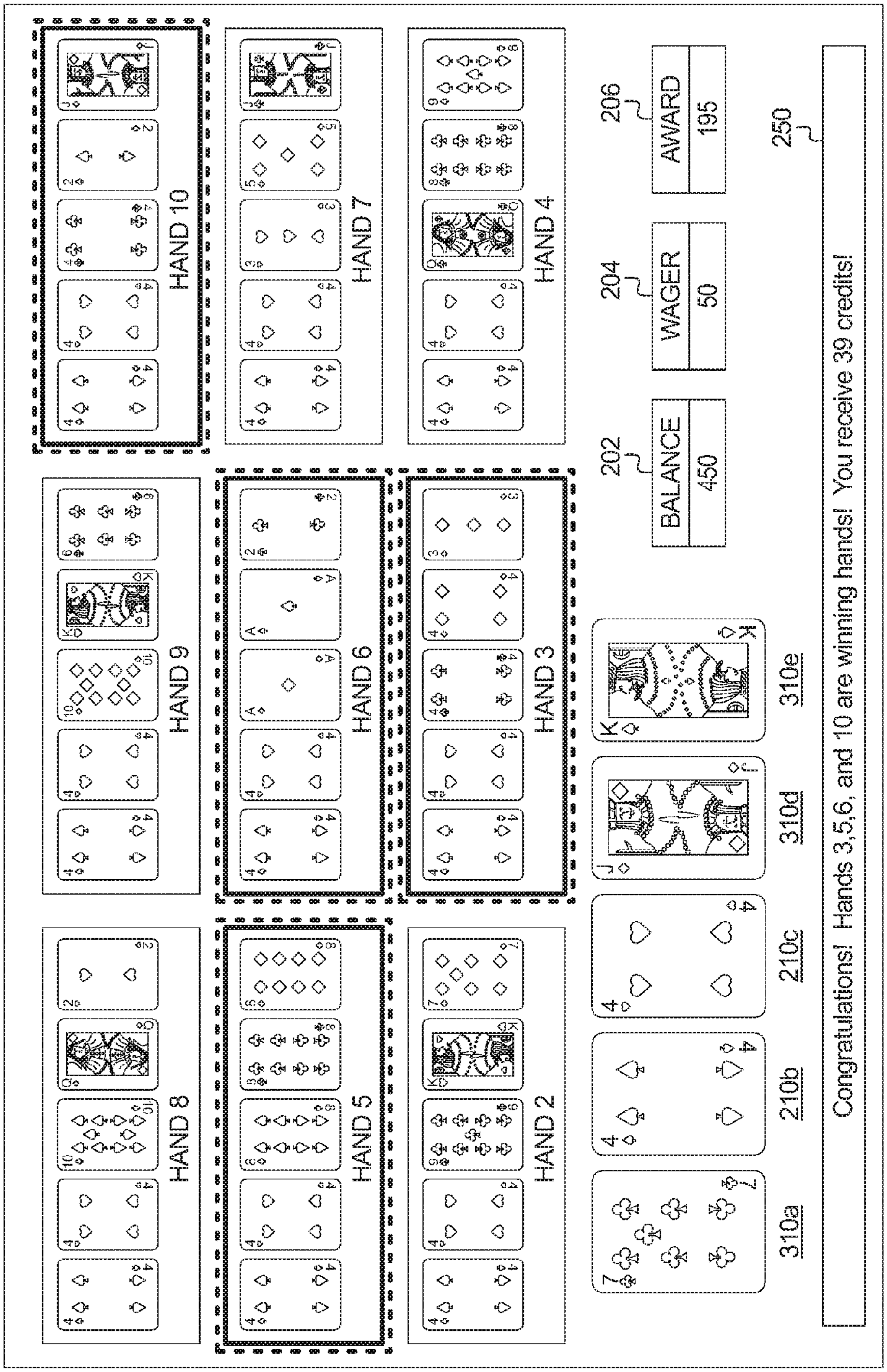

Turning to FIG. 2C, after the gaming system displays the held cards from the base hand of cards for each of the hand of cards, the gaming system displays replacement cards to complete each of the wagered-on hands of cards. For instance, in the base hand of cards, the gaming system displays three replacement cards 7♣, J♦, and K♠, as indicated by, 310*a*, 310*d*, and 310*e*.In this embodiment, the gaming system randomly selects the replacement cards from a separate virtual deck of 50 cards for each hand of cards. More specifically, in this embodiment, for of the wagered-on hands of cards, the gaming system uses a separate virtual deck of cards and removes the held cards from the base hand of cards (i.e., 4♠ and 4♥) from each virtual deck of cards.

As further illustrated in FIG. 2C, the gaming system evaluates each wagered-on hand of cards to determine any award associated with the completed wagered-on hands of cards. In this example, the gaming system evaluates each wagered-on hand of cards based on the standard five-card Jacks or Better paytable below. Since the player wagered five credits for each hand of cards, the any award associated with the wagered-on hands of cards is listed in the fifth column under the “5 credit” heading. In this example, as illustrated in FIG. 2C, the gaming system determines the following hands are associated with the following awards based on the standard Jacks or Better paytable: (a) Hand 3 includes a four-of-a-kind associated with an award of 125 credits, (b) Hand 5 includes a full house associated with an award of 45 credits, (c) Hand 6 includes two pairs associated with an award of 10 credits, and (d) Hand 10 includes a three-of-a-kind associated with an award of 15 credits. The gaming system displays the total award of 195 credits (125 credits for the four-of-a-kind+45 credits for the full house+ 10 credits for the two pair combination+15 credits for the three-of-a-kind) as indicated by award meter 206. The gaming system displays the following message in the message box 250: “CONGRATULATIONS! HANDS 3, 5, 6, AND 10 ARE WINNING HANDS! YOU RECEIVE 195 CREDITS!”

TABLE 2

Example Jacks or Better Paytable

| | 1 Credit | 2 Credits | 3 Credits | 4 Credits | 5 Credits |
|---|---|---|---|---|---|
| Royal Hush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

After the gaming system displays any award associated with the completed wagered-on hands of cards, the gaming system determines whether any of the completed wagered-on hands of cards include any designated card combinations. In this embodiment, the designated card combinations include all of the winning card combinations based on the paytable. Thus, in this embodiment, Hand 3, Hand 5, Hand 6, and Hand 10 each include one of the designated card combinations. For each hand of cards including one of the designated card combinations, the gaming system displays a new hand of cards. In this embodiment, before displaying any new hands of cards, the gaming system reconfigures the display of the hands of cards.

Figure 2D:
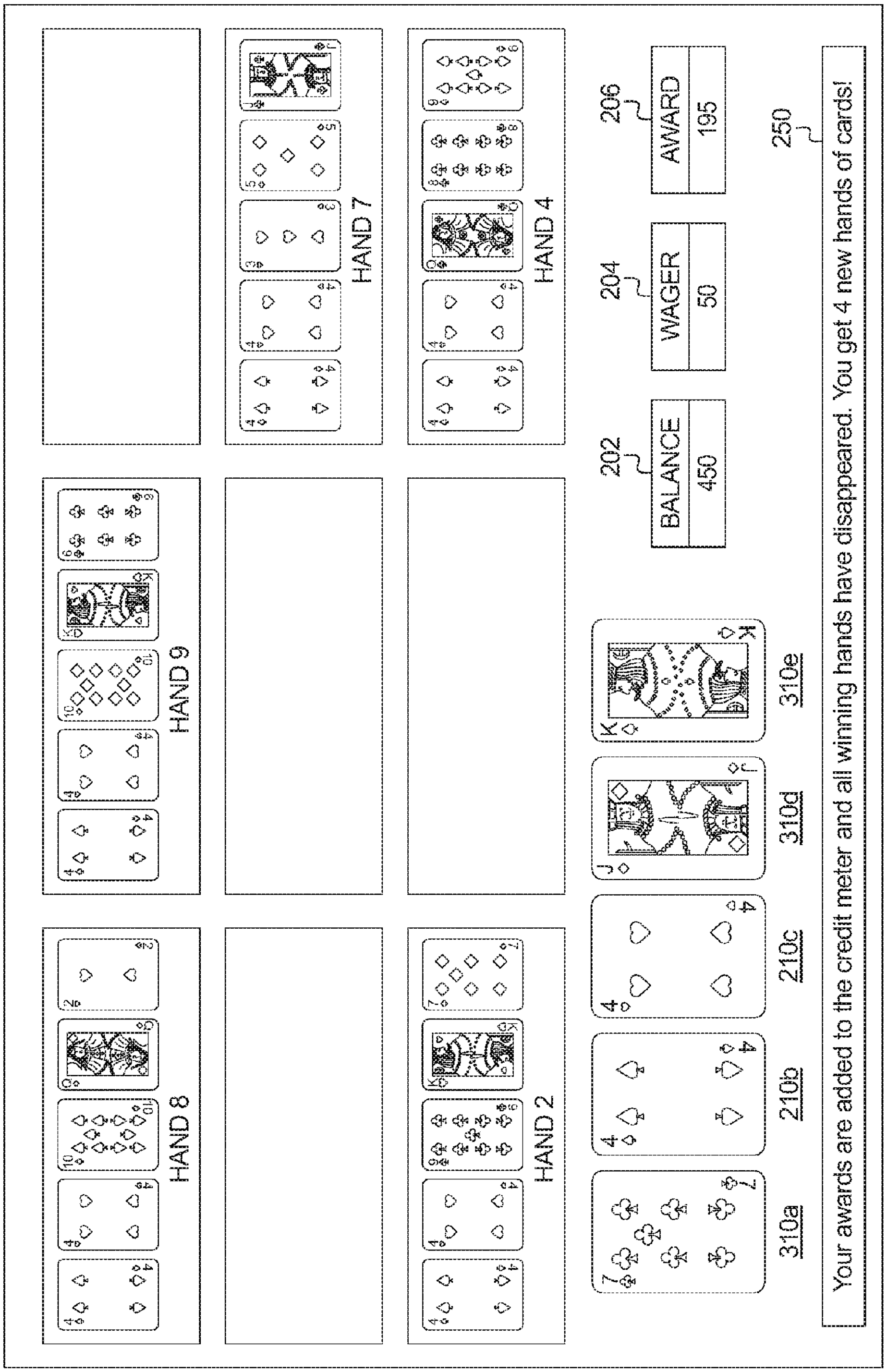

As illustrated in FIG. 2D, in this example, the gaming system first removes, from the display, each of the completed wagered-on hands of cards including one of the designated card combinations. Thus, the gaming system removes Hand 3, Hand 5, Hand 6, and Hand 10 from the display. The gaming system displays the following message in the message box 250: “YOUR AWARDS ARE ADDED TO THE CREDIT METER! ALL WINNING HANDS HAVE DISAPPEARED. YOU GET FOUR NEW HANDS OF CARDS!”

Figure 2E:
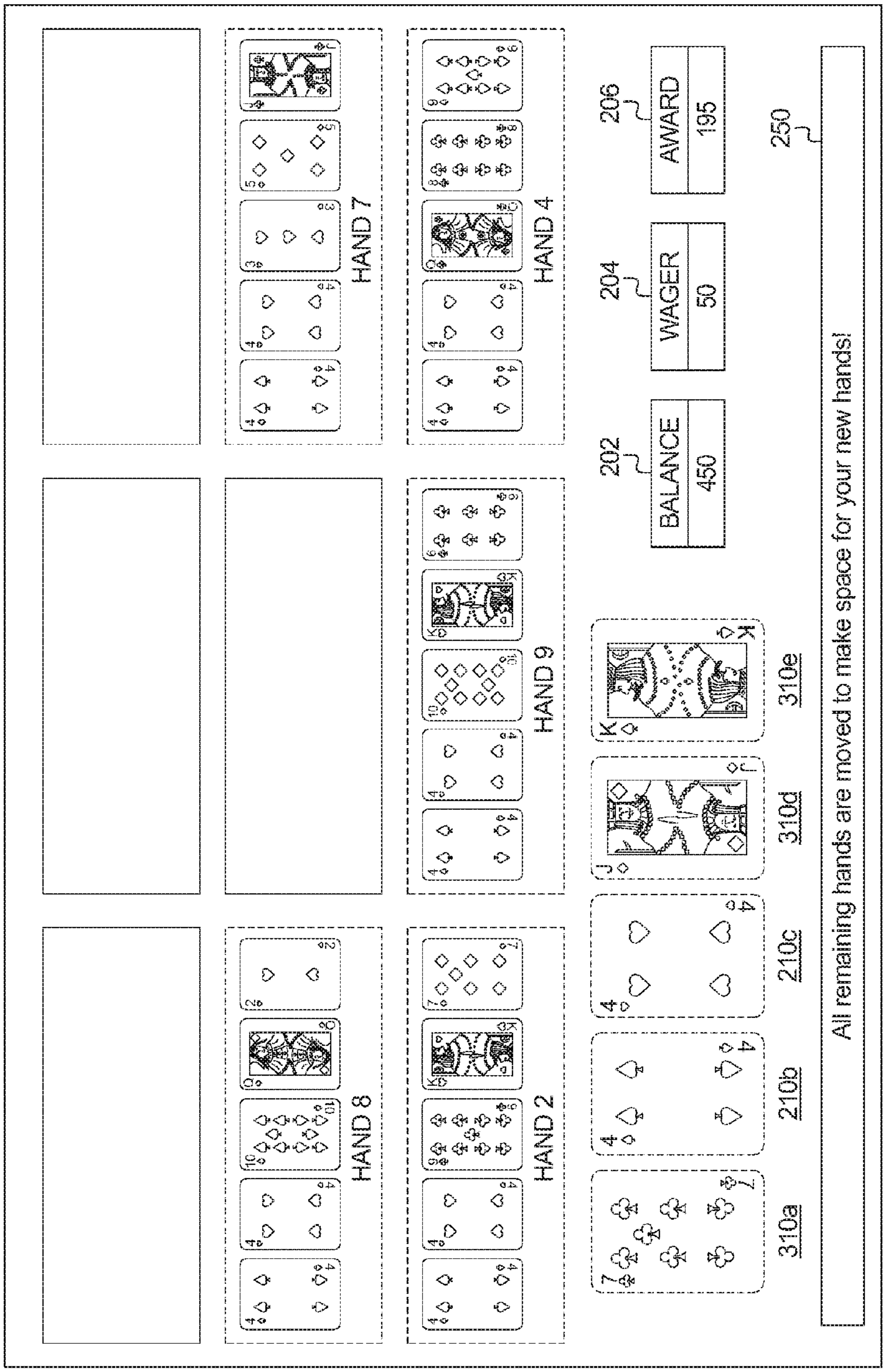

As illustrated in FIG. 2E, the gaming system in this embodiment cascades the remaining hands of cards (i.e., the base hand, Hand 2, Hand 4, Hand 7, Hand 8, and Hand 9) down so that all remaining hands are at the bottom of the display and all empty spaces from the removed hands of cards (i.e., Hand 3, Hand 5, Hand 6, and Hand 10) are at the top of the display. The gaming system displays the following message in the message box 250: “ALL REMAINING HANDS HAVE BEEN REMOVED TO MAKE SPACE FOR YOUR NEW HANDS!”

It should be appreciated that in certain alternative embodiments, the gaming system reconfigures the remaining hands of cards in a suitable different way than as show in FIG. 2E. In other alternative embodiments, the gaming system does not reconfigure the remaining hands of cards.

Figure 2F:
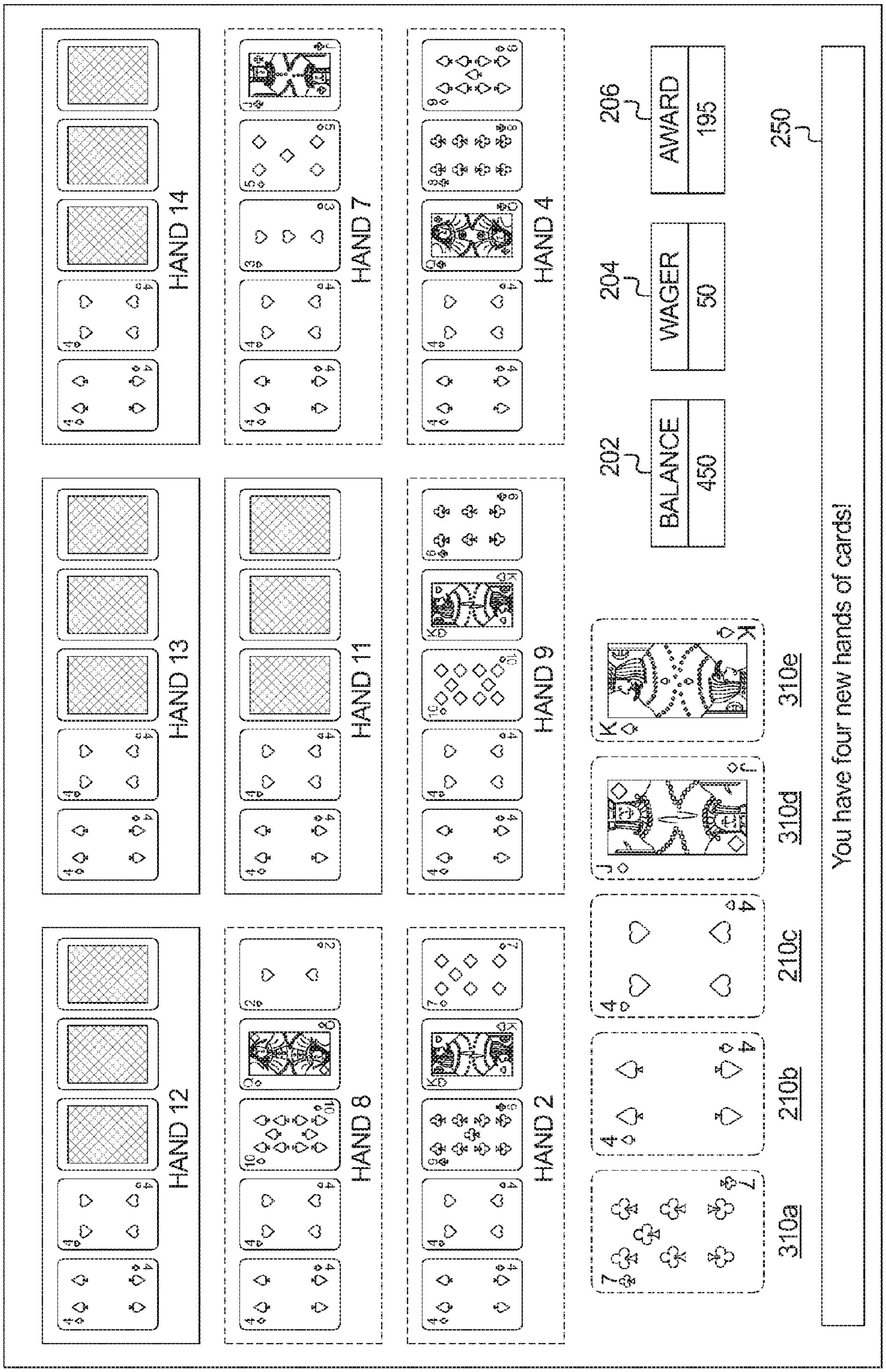

Turning to FIG. 2F, for each of the four removed wagered-on hands of cards, the gaming system displays four new hands of cards. More specifically, in this example, the gaming system displays: Hand 11, Hand 12, Hand 13, and Hand 14. For each of the new hands of cards, the gaming system displays duplicates of the initially held cards from the initial base hand of cards, the 4♠ and 4♥. The gaming system displays the following message in the message box 250: “YOU HAVE FOUR NEW HANDS OF CARDS!”

Figure 2G:
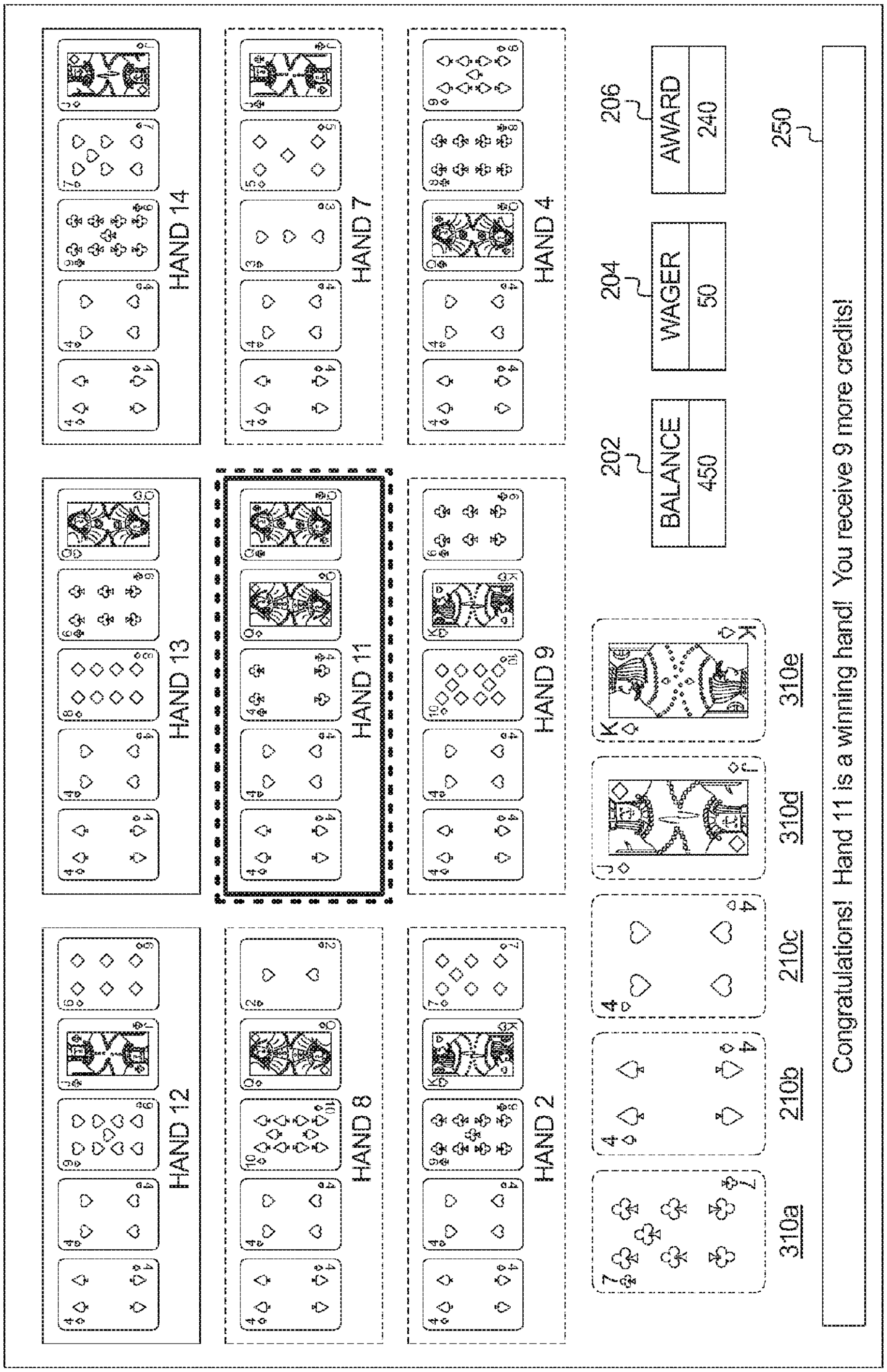

Turning now to FIG. 2G, the gaming system completes each of the new hands of cards with any needed replacement cards from a separate virtual deck of 50 cards (i.e., a standard virtual deck of 52 cards with the 4♠ and 4♥ removed). The gaming system then determines and displays any awards associated with the completed new hands of cards based on the standard five-card Jacks or Better paytable. In this example, the gaming system determines that Hand 11 is a winning hand including a full house. The gaming system displays the additional 45 credit award associated with the full house as indicated in the award meter 206.

In this example embodiment, the gaming system ends the play of the game after the second round of the play of the game. In this embodiment, the gaming system provides 10 hands of cards in the first round, and new hands of cards for any hands of cards including any designated card combinations in the second round. In this embodiment, the gaming system does not determine whether the new hands of cards include any designated card combinations resulting in a new, draw hands of cards. In certain alternative embodiments, the gaming system continues to provide a new hand of cards for each hand of cards including any designated card combinations until there are no new hands of cards including one of the designated card combinations. In other alternative embodiments, as described in greater detail below, the gaming system provides up to a maximum quantity of new draw hands. Thus, in one such embodiment, the gaming system continues to provide new draw hands for each hand of cards including any designated card combination until either: (1) the gaming system reaches the maximum quantity of new hands available, or (2) there are no new hands of cards including any designated card combinations.

Wager for the New Draw Hands

As described above, the gaming system enables a player to place a wager on one or more of a plurality of hands for a play of the game. In the example described above with respect to FIGS. 2A to 2G, the main wager for the primary card game funds the base game and the new draw hands feature. In various alternative embodiments, the gaming system receives a separate wager for the primary or base game (including a separate wager on each hand) and a separate secondary or side wager for the new draw hands feature. In one embodiment, the new draw hands feature may additionally or alternatively be employed as or in association with a bonus game or a secondary game upon receiving a side bet in addition to the primary wager for the base game. In one such embodiment, a player must place or wager a side bet to be eligible to receive the new draw hands feature associated with the side bet. In an alternative embodiment, the player must place a maximum wager for the primary game and a side wager to be eligible for the new draw hands feature.

In various embodiments of the present disclosure, the gaming system determines a quantity of initial hands based on the wager. In certain embodiments, the gaming system provides the quantity of new hands based on wager. More specifically, in one embodiment, the greater the wager, the greater the maximum quantity of new hands for the play of the game. In certain alternative embodiments, the quantity of rounds for new draw hands and/or the quantity of new draw hands available for the play of the game are based on the wager placed by the player. In various embodiments of the present disclosure the quantity of rounds of new draw hands, or the total quantity of new draw hands available are predetermined for the play of the game. In other alternative embodiments, the quantity of rounds of new draw hands and/or the quantity of new draw hands is randomly determined for each play of the game.

Card Game Variations

In various embodiments of the present disclosure, the gaming system employs the multi-hand draw poker game in a plurality of different ways. More specifically, in the example embodiment described above with respect to FIGS. 2A to 2G, the gaming system randomly selects a base hand of cards and enables a player to select zero, one, or a plurality of the cards of the base hand of cards to hold for each of the plurality of hands for the play of the game. Thus, the gaming system duplicates the held base cards from the base hand of cards for each of the remaining wagered-on hands of cards of the play of the game and for any new hands of card generated during the play of the game. In certain alternative embodiments, the gaming system enables the player to select different cards from the base hand of cards to hold for each different round of the play of the game. More specifically, in one example embodiment, for a play of be dTR, the gaming system displays a first, or base, hand of cards including: A♥, A♠, K♠, Q♠, and J♠. The gaming system enables the player to select zero, one, or a plurality of the cards of the base hand to hold. In this example embodiment, the player selects the A♥ and A♠ to hold for the base hand of cards. The gaming system duplicates the held base cards, A♥ and A♠, for each of the other wagered-on hands of cards and completes each hand of cards. It should be appreciated that by holding the A♥ and A♠, the player obtains a winning hand for each of the wagered-on hands of cards. In this example embodiment, for a second round of the play of the game, for any new hands of cards, the gaming system displays the same base hand of cards and enables the player to select different cards to hold for the new hands of cards.

In various alternative embodiments, the gaming system enables the player to select which cards to hold for the base hand of cards, and the gaming system automatically selects which cards to hold for each of the remaining hands of cards. In another embodiment, the gaming system automatically selects which cards of the base hand to hold and enables the player to select which cards to hold for each of the remaining hands of cards. In another alternative embodiment, the gaming system enables the player to select which cards to hold for each of the plurality of wagered-on hands of the first round of the play of the game, and the gaming system determines which cards from the base hand of cards to hold for each of the new hands of cards after the first round of the play of the game.

In another alternative embodiment, the gaming system provides a different base hand of cards for each round of the play of the game. More specifically, the gaming system provides a first base hand of cards for a first round of the play of the game. After the gaming system determines whether there are any designated card combinations, the gaming system displays a new base hand of cards for any new hand of cards. In another alternative embodiment, the gaming system provides a different hand of cards for each of the plurality of hands of cards. More specifically, in one such embodiment, the gaming system does not display a base hand separately. In this embodiment, the gaming system randomly selects and displays cards for each of the plurality of wagered-on hands of cards from separate virtual decks of cards. The gaming system then enables the player to select which cards to hold for each hand of cards.

In various embodiments of the present disclosure, the gaming system employs a stud poker card game. More specifically, in one embodiment, the gaming system randomly selects and displays a first quantity of wagered-on hands of cards. For each of a first quantity of hands of cards, the gaming system randomly selects a hand of cards from a separate virtual deck of 52 cards. The gaming system then determines and displays any awards associated with the wagered-on hands of cards. The gaming system also determines whether any of the wagered-on hands of cards includes any designated card combination. For any wagered-on hands of cards including any designated card combinations, the gaming system provides a new hand of cards. For each new hand of cards, the gaming system randomly selects and displays a hand of cards from a separate virtual deck of 52 cards. The gaming system continues this process until there are no new hands of cards including one of the designated card combinations or until the gaming system reaches a predetermined limit.

Designated Card Combinations

In various embodiments of the present disclosure, the gaming system provides a new draw hand for each hand of cards including any designated card combination. In the embodiments described above with respect to FIGS. 2A to 2G, the gaming system provides a new draw hand for each completed wagered-on hand of cards including any designated card combination. In those embodiments, the designated card combinations are all of the winning card combinations base on a paytable. In certain alternative embodiments, the designated card combinations are a subset of the winning card combinations based on a paytable. In other alternative embodiments, the designated card combination is a different predetermined combination of cards that is not one of the winning card combinations based on a paytable. For example, in one such embodiment, the designated card combination is any card combination including a particular combination of suits, or a particular combination of values. In another embodiment, the designated card combination is any of the non-winning card combinations based on the paytable.

In various alternative embodiments, the designated card combination is different for each round of the play of the game. More specifically, in one such embodiment, for a first round of the play of the game, the designated card combinations are any of the winning card combinations. In this embodiment, for the second round of the play of the game, the designated card combinations are a subset of the winning card combinations from the first round. For example, the designated card combinations in the second round of the play of the game (i.e., any new hands of cards) are any winning card combinations associated with a greater award than any winning card combinations from the first round of the play of the game (i.e., any of the initially wagered-on hands of cards). In another embodiment, the designated card combinations in the first round of the play of the game are any of a first subset of winning card combinations, and the designated card combinations in the second round of the play of the game are any of a second different subset of winning card combinations than from the first round.

Quantity of New Draw Hands

In various embodiments of the present disclosure, the gaming system provides the new draw hands in a plurality of ways. In the embodiments described above with respect to FIGS. 2A to 2G, the gaming system provides a new hand of cards for each completed wagered-on hand of cards including a designated card combination. In certain alternative embodiments, the gaming system provides a new hand of cards for every two completed wagered-on hands of cards including one of the designated card combinations. In certain other embodiments, the gaming system provides multiple new hands of cards for each completed wagered-on hand of cards including any designated card combination. For example, the gaming system provides two new draw hands for each completed wagered-on hand of cards including any designated card combination. In another embodiment, the quantity of new draw hands provides for each completed wagered-on hand of cards including one of the designated card combinations is different for each round of the play of the game.

In certain embodiments the gaming system provides new draw hands for the play of the game until a terminating condition occurs. In one embodiment, the terminating condition triggered when there are no new hands of cards including a designated card combination. More specifically, in the embodiment described above with respect to FIG. 1, the gaming system provides new draw hands for each hand of cards including one of the designated card combinations until there are no longer any new hands of cards including one of the designated card combinations. In certain alternative embodiments, the terminating condition is triggered when the gaming system provides a determined quantity of new draw hands. For example, in the embodiments described above with respect to FIGS. 2A to 2G, the gaming system initially provides ten hands of cards. In one embodiment, the gaming system sets a limit on the quantity of new draw hands to be a multiple of the initial quantity of hands, such as for example 2 times the initial quantity of hands of cards or a maximum of 20 hands. In one example where there maximum quantity of new draw hands is 20 hands, the gaming system continues to provide new draw hands until the gaming system has provided 20 new draw hands, or until there are no longer any hands of cards including one of the designated card combinations. In certain embodiments, the limit on the quantity of new hands is based on the wager for the play of the game.

In other alternative embodiments, the gaming system provides new draws hand for a determined quantity of rounds. For example, in the embodiment described above with respect to FIGS. 2A to 2E, the gaming system provides two rounds of the play of the game and one round of new draw hands. In certain alternative embodiments the gaming system provides a different determined quantity of rounds of plays of the game and/or rounds of new draw hands.

Reconfiguring the Display

In various embodiments of the present disclosure, the gaming system reconfigures the display of the hands of cards prior to providing any new draw hands. In the embodiment described above with respect to FIGS. 2A to 2G, the gaming system reconfigures the displays so that any hands of cards including one of the designated card combinations are removed and any remaining hands of cards are grouped together at the bottom of the display. In certain alternative embodiments, the gaming system reconfigures the display of the hands of cards in a different way than that described with respect to this embodiment. For example, in one embodiment, the gaming system displays all remaining hands of cards on the left (or right) side of the display and all open spaces on the right (or left) side of the display.

In another alternative embodiment, the gaming system removes the display of any hand of cards that does not include any designated card combination. More specifically, the gaming system removes any hand of cards not including a designated card combination, and for all remaining hands the gaming system displays a new hand of cards. In other alternative embodiments, the gaming system does not reconfigure the display at all. For example, the gaming system simply removes the hands of cards including any designated card combinations and leaves all remaining hands of cards in their original position. In various alternative embodiments, the gaming system changes the display of certain hands of cards rather than removing the display of the hands of cards. In one such embodiment, the gaming system changes the display of the hands of cards including one of the designated card combinations such as by reducing the size of those hands of cards, or changing the color of those hands of cards.

Paytables for New Draw Hands

In various embodiments of the present disclosure the gaming system uses a different modified paytable to evaluate any new hand of cards. More specifically, in the example embodiments described above with reference to FIGS. 2A to 2G, the gaming system uses the same paytable to evaluate all hands (i.e., the original wagered-on hands of cards and any new hands of cards) for the play of the game. In certain alternative embodiments, the gaming system uses a modified paytable to evaluate any new hands of cards that replaced any previous hand of cards including a designated card combination. More specifically, in one example embodiment, the gaming system uses a first paytable to evaluate the wagered-on hands of cards in the first round of the play of the game and the gaming system uses a second modified paytable to evaluate the new hands of cards for each subsequent round in the play of the game. In another embodiment, the gaming system uses a different modified paytable for each round in the play of the game. More specifically, in one example embodiment, the gaming system uses a first paytable to evaluate the original wagered-on hands of cards of the first round in the play of the game, a second modified paytable to evaluate any new hands of cards in the second round of the play of the game, and a third modified paytable to evaluate any new hands in the third round of the play of the game. It should be appreciated that in certain embodiments the modified paytables are associated with a greater average expected payout than an unmodified paytable. In other embodiments the unmodified paytables are associated with a greater average expected payout than a modified paytable.

It should be appreciated that the awards may be any suitable awards such as, but not limited to: (1) monetary credits or currency; (2) non-monetary credits or currency; (3) a modifier (such as a multiplier) used to modify one or more awards; (4) one or more free plays of a game (such as one or more free spins of a slot game); (5) one or more plays of one or more bonus games (such as a free spin of an award wheel); (6) one or more lottery based awards (such as one or more lottery or drawing tickets); (7) a wager match for one or more plays of the a wagering game; (8) an increase in an average expected payback percentage of a bonus game and/or an average expected payback percentage of a primary wagering game for one or more plays; (9) one or more comps (such as a free dinner or a free night's stay at a hotel); (10) one or more bonus or promotional credits usable for online play; (11) one or more player tracking points; (12) a multiplier for player tracking points or credits; (13) an increase in a membership or player tracking level; (14) one or more coupons or promotions usable within a gaming establishment and/or outside of the gaming establishment (e.g., a 20% off coupon for use at a retail store or a promotional code providing a deposit match for use in association with an online casino); (15) an access code usable to unlock content on the Internet; (16) a progressive jackpot or other progressive award; (17) a high value product or service (such as a car); and/or (18) a low value product or service (such as a teddy bear).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
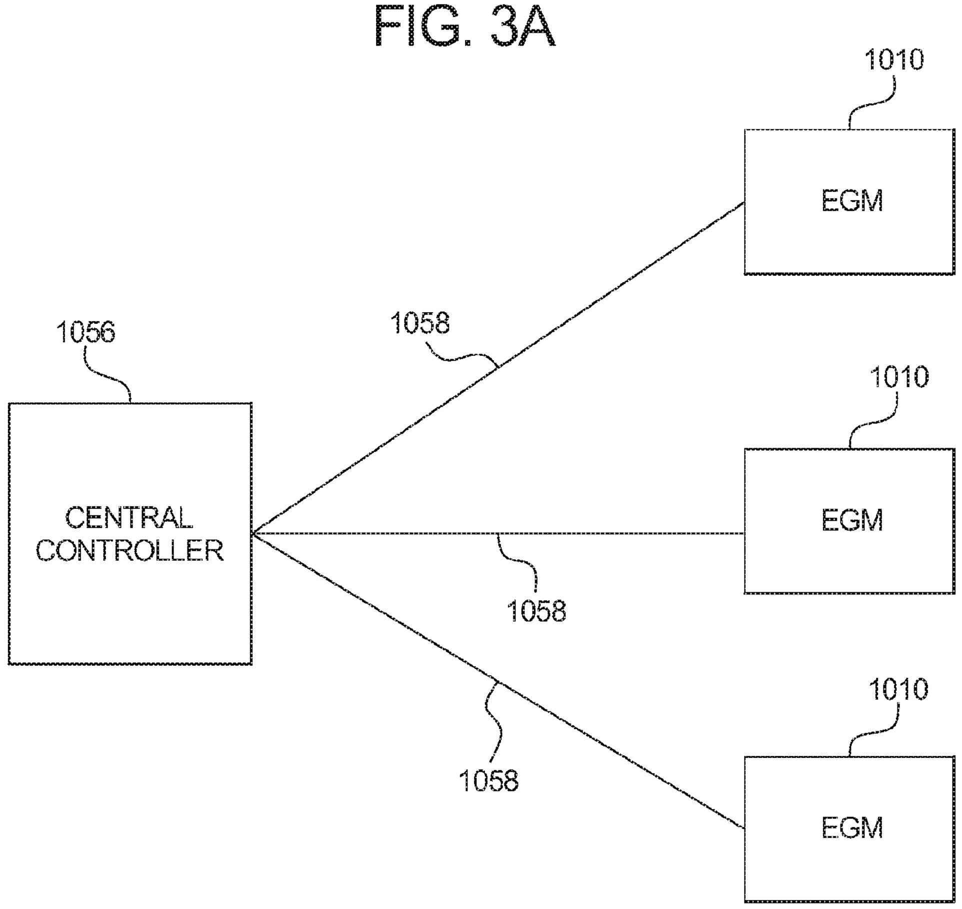
FIG. 3A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 3010 that are each configured to communicate with a central server, central controller, or remote host 3056 through a data network 3058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
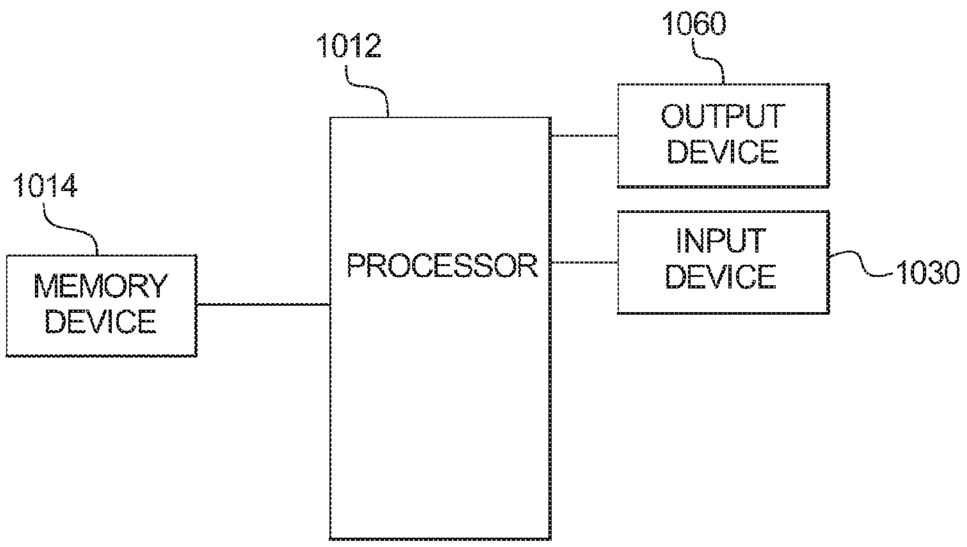
FIG. 3B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 3012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 3014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
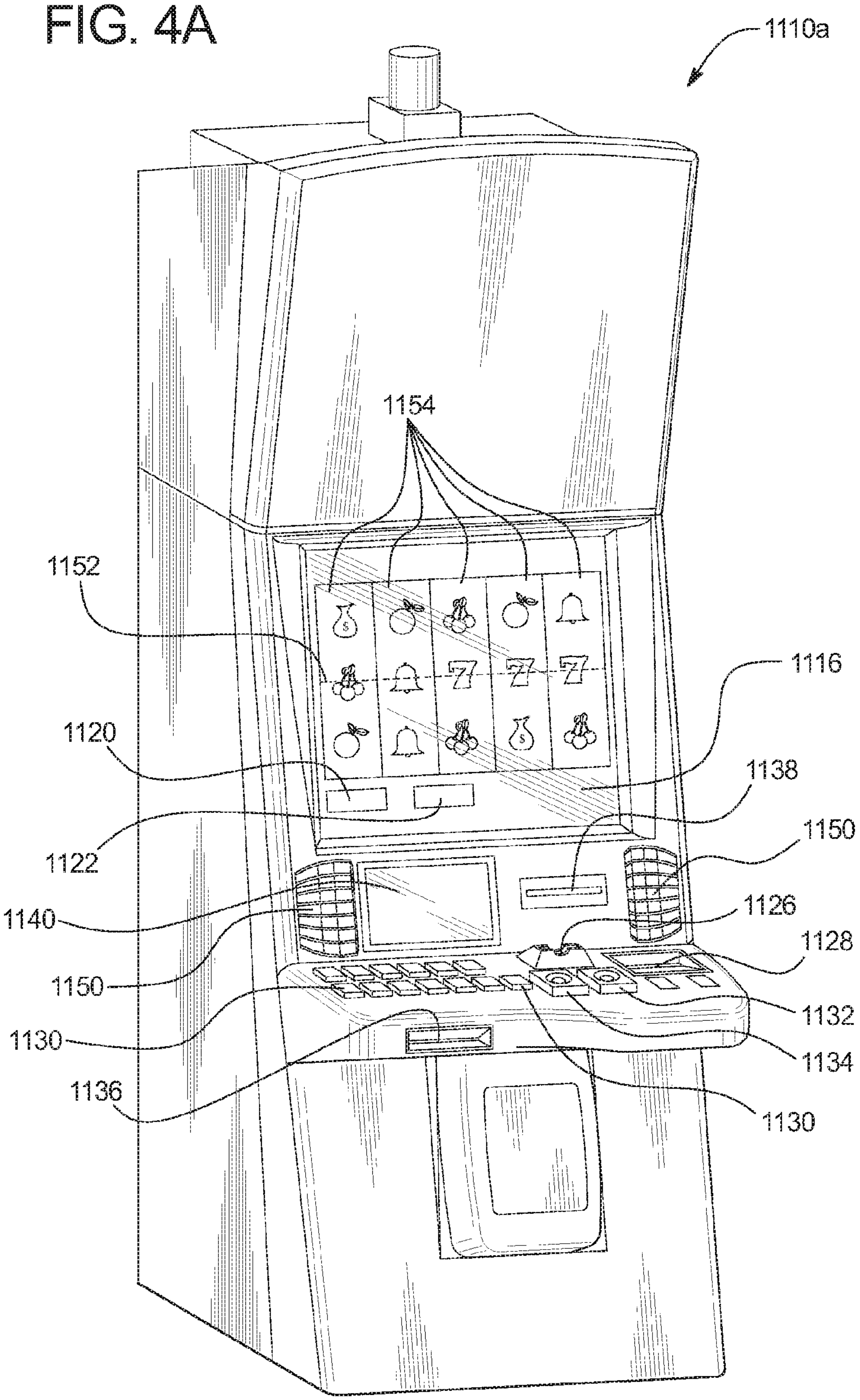
FIGS. 4A and 4B are perspective views of example alternative embodiments of the gaming system of the present disclosure.
Figure 4B:
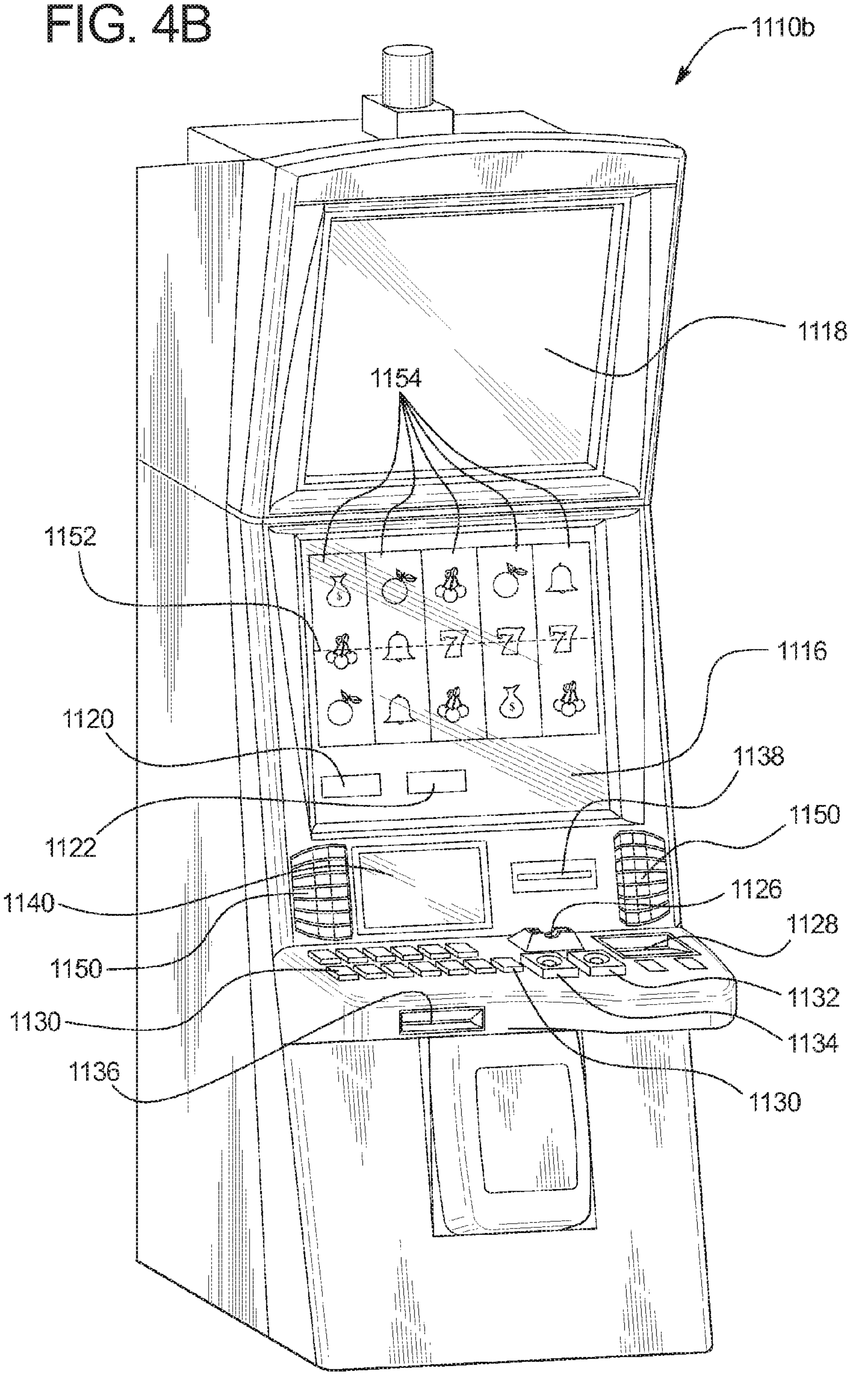

In various embodiments, the EGM includes one or more input devices. The input devices may include any suitable device that enables an input signal to be produced and received by the at least one processor of the EGM. The example EGM illustrated in FIG. 3B includes at least one input device 3030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 3128, and (b) a coin slot 3126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 3132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 3134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 3138. The card reader is configured to read a player identification card inserted into the card reader.

In various embodiments, the EGM includes one or more output devices. The example EGM illustrated in FIG. 3B includes at least one output device 3060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 3116, a player tracking display 3140, a credit display 3120, and a bet display 3122. The example EGM illustrated in FIG. 4B includes a central display device 3116, an upper display device 3118, a player tracking display 3140, a player tracking display 3140, a credit display 3120, and a bet display 3122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 3136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 3150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B include a payline 3152 and a plurality of reels 3154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

at least one processor;

at least one display device;

at least one input device; and at least one memory device storing a plurality of instructions which, when executed by the at least one processor, cause the at least one processor to operate with the at least one display device and the at least one input device, for a plurality of plays of a game, to:

(A) receive a wager to initiate a play of a game including a first quantity of hands of cards, wherein the first quantity of hands of cards includes a base hand of cards and at least one additional hand of cards;

(B) randomly select and display the base hand of cards;

(C) enable the player to select zero, one, or a plurality of the cards from the base hand of cards to hold;

(D) for each of the additional hands of cards, display the held cards from the base hand of cards;

(E) for each of the first quantity of hands of cards:

(i) complete the hand of cards with any needed replacement cards and display the completed hand of cards;

(ii) display any award associated with the completed hand of cards; and (iii) determine whether the completed hand of cards includes any designated card combination; and (F) for each completed hand of cards including one of the designated card combinations:

(i) remove the display of said completed hand of cards including the designated card combination;

(ii) after removing the display of said completed hand of cards, display a new hand of cards including the held cards from the base hand of cards;

(iii) complete the new hand of cards with any needed replacement cards and display the new completed hand of cards;

(iv) display any award associated with the new hand of cards; and (v) determine whether said completed new hand of cards includes any designated card combination.

2. The gaming system of claim 1, wherein each of the designated card combination is a winning card combination based on a paytable.

3. The gaming system of claim 1, wherein the plurality of instructions, which when executed by the at least one processor, cause the at least one processor to operate with the at least one display device and the at least one input device to for any completed new hand of cards include any designated card combination, repeat (F)(i) to (F)(v).

4. The gaming system of claim 3, wherein the plurality of instructions, which when executed by the at least one processor, cause the at least one processor to operate with the at least one display device and the at least one input device to repeat (F)(i) to (F)(v) until a terminating condition occurs.

5. The gaming system of claim 4, wherein the terminating condition occurs when there are no completed new hands of cards including any of the designated card combinations.

6. The gaming system of claim 1, wherein prior to displaying any new hands of cards, the plurality of instructions which, when executed by the at least one processor, cause the at least one processor to reconfigure the display of any remaining hands of cards by moving the display of any remaining hands of cards down and creating an open space for any new hands of cards.

7. A method of operating a gaming system, said method comprising:

(A) causing at least one processor to execute a plurality of instructions to receive a wager to initiate a play of a game including a first quantity of hands of cards, wherein the first quantity of hands of cards includes a base hand of cards and at least one additional hand of cards;

(B) causing the at least one processor to execute the plurality of instructions to operate with at least one display device to randomly select and display the base hand of cards;

(C) causing the at least one processor to execute the plurality of instructions to operate with at least one input device to enable the player to select zero, one, or a plurality of the cards from the base hand of cards to hold;

(D) for each of the additional hands of cards, causing the at least one processor to execute the plurality of instructions to operate with the at least one display device to display the held cards from the base hand of cards;

(E) for each of the first quantity of hands of cards:

(i) causing the at least one processor to execute the plurality of instructions to complete the hand of cards with any needed replacement cards and display the completed hand of cards;

(ii) causing the at least one processor to execute the plurality of instructions to operate with at least one display device to display any award associated with the completed hand of cards; and (iii) causing the at least one processor to execute the plurality of instructions to determine whether the completed hand of cards includes any designated card combination; and (F) for each completed hand of cards including one of the designated card combinations:

(i) causing the at least one processor to execute the plurality of instructions to remove the display of said completed hand of cards including the designated card combination;

(ii) after removing the display of said completed hand of cards, causing the at least one processor to execute the plurality of instructions to operate with at least one display device to display a new hand of cards including the held cards from the base hand of cards;

(iii) causing the at least one processor to execute the plurality of instructions to complete the new hand of cards with any needed replacement cards and display the new completed hand of cards;

(iv) causing the at least one processor to execute the plurality of instructions to operate with at least one display device to display any award associated with the new hand of cards; and (v) causing the at least one processor to execute the plurality of instructions to determine whether the completed new hand of cards includes any designated card combination.

8. The method of claim 7, wherein each of the designated card combination is a winning card combination based on a paytable.

9. The method of claim 7, which includes causing the at least one processor to execute the plurality of instructions to operate with the at least one display device to for any completed new hand of cards including one of the designated card combinations, repeat (F)(i) to (F)(v).

10. The method of claim 9, which includes causing the at least one processor to execute the plurality of instructions to operate with the at least one display device to repeat (F)(i) to (F)(v) until a terminating condition occurs.

11. The method of claim 10, which including causing the at least one processor to execute the plurality of instructions to cause the terminating condition occurs when there are no completed new hands of cards including any of the designated card combinations.

12. The method of claim 7, which includes, prior to displaying any new hands of cards, causing the at least one processor to execute the plurality of instructions to operate with the at least one display device to reconfigure the display of any remaining hands of cards by moving the display of any remaining hands of cards down and creating an open space for any new hands of cards.

13. The method of claim 7, which is executed through a data network.

14. The method of claim 13, wherein the data network is an internet.

15. A non-transitory computer readable medium storing a plurality of instructions which, when executed by at least one processor, cause the at least one processor to operate with at least one display device and at least one input device for a play of the game to:

(A) receive a wager to initiate a play of a game including a first quantity of hands of cards, wherein the first quantity of hands of cards includes a base hand of cards and at least one additional hand of cards;

(B) randomly select and display the base hand of cards;

(C) enable the player to select zero, one, or a plurality of the cards from the base hand of cards to hold;

(D) for each of the additional hands of cards, display the held cards from the base hand of cards;

(E) for each of the first quantity of hands of cards:

(i) complete the hand of cards with any needed replacement cards and display the completed hand of cards;

(ii) display any award associated with the completed hand of cards; and (iii) determine whether the completed hand of cards includes any designated card combination; and (F) for each completed hand of cards including one of the designated card combinations:

(i) remove the display of said completed hand of cards including the designated card combination;

(ii) after removing the display of said completed hand of cards, display a new hand of cards including the held cards from the base hand of cards;

(iii) complete the new hand of cards with any needed replacement cards and display the new completed hand of cards;

(iv) display any award associated with the new hand of cards; and (v) determine whether said completed new hand of cards includes any designated card combination.

16. The non-transitory computer readable medium of claim 15, wherein each of the designated card combination is a winning card combination based on a paytable.

17. The non-transitory computer readable medium of claim 15, wherein the plurality of instructions, which when executed by the at least one processor, cause the at least one processor to operate with the at least one display device and the at least one input device to for any completed new hand of cards including one of the designated card combinations, repeat (F)(i) to (F)(v).

18. The non-transitory computer readable medium of claim 17, wherein the plurality of instructions, which when executed by the at least one processor, cause the at least one processor to operate with the at least one display device and the at least one input device to repeat F(i) to (F)(v) until a terminating condition occurs.

19. The non-transitory computer readable medium of claim 18, wherein the terminating condition occurs when there are no completed new hands of cards including any of the designated card combinations.

20. The non-transitory computer readable medium of claim 15, wherein prior to displaying any new hands of cards, the plurality of instructions which, when executed by the at least one processor, cause the at least one processor to reconfigure the display of any remaining hands of cards by moving the display of any remaining hands of cards down and creating an open space for any new hands of cards.

* * * * *